(12) United States Patent
Yamamura

(10) Patent No.: US 10,120,807 B2
(45) Date of Patent: Nov. 6, 2018

(54) PROCESSOR AND METHOD

(71) Applicant: FUJITSU LIMITED, Kawasaki-shi, Kanagawa (JP)

(72) Inventor: Shuji Yamamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 61 days.

(21) Appl. No.: 15/230,523

(22) Filed: Aug. 8, 2016

(65) Prior Publication Data

US 2017/0052781 A1 Feb. 23, 2017

(30) Foreign Application Priority Data

Aug. 17, 2015 (JP) .................................. 2015-160447

(51) Int. Cl.
*G06F 12/0864* (2016.01)
*G06F 12/0875* (2016.01)
*G06F 12/126* (2016.01)

(52) U.S. Cl.
CPC ...... *G06F 12/0875* (2013.01); *G06F 12/0864* (2013.01); *G06F 12/126* (2013.01); *G06F 2212/1044* (2013.01); *G06F 2212/452* (2013.01); *G06F 2212/6042* (2013.01); *Y02D 10/13* (2018.01)

(58) Field of Classification Search
CPC ............... G06F 9/3001; G06F 12/0864; G06F 12/0875; G06F 12/126; G06F 2212/1044; G06F 2212/452; G06F 2212/6042; Y02B 60/1225
See application file for complete search history.

(56) References Cited

U.S. PATENT DOCUMENTS

| 6,185,657 B1* | 2/2001 | Moyer | G06F 12/0848 711/128 |
| 7,774,391 B1* | 8/2010 | Le | G06F 17/30233 707/822 |
| 2010/0191990 A1* | 7/2010 | Zhang | G06F 12/0864 713/320 |

(Continued)

FOREIGN PATENT DOCUMENTS

| JP | 2000-298618 | 10/2000 |
| JP | 2003-131945 | 5/2003 |
| JP | 2008-310465 | 12/2008 |

*Primary Examiner* — Nanci N Wong
(74) *Attorney, Agent, or Firm* — Fujitsu Patent Center

(57) ABSTRACT

A processor includes an arithmetic processing circuit, a cache memory including a plurality of ways, a usage information register storing usage information indicating whether to use each of the plurality of ways, a purge control circuit performing purge processing on a basis of rewriting of the usage information within the usage information register according to an instruction executed by the arithmetic processing circuit, the purge processing including processing of deleting, from the cache memory, target data retained in a target way to be stopped and processing of writing back part of the target data, the part of the target data being data rewritten in the cache memory, to a main memory at a lower level than the cache memory, and an access control circuit controlling accessing the cache memory on a basis of a memory access request received from the arithmetic processing circuit and status of the purge processing.

13 Claims, 21 Drawing Sheets

(56) References Cited

U.S. PATENT DOCUMENTS

| | | | |
|---|---|---|---|
| 2011/0167224 A1* | 7/2011 | Isono | G06F 12/0848 |
| | | | 711/122 |
| 2012/0054440 A1* | 3/2012 | Doig | G06F 17/30902 |
| | | | 711/122 |
| 2012/0096295 A1* | 4/2012 | Krick | G06F 1/3275 |
| | | | 713/324 |
| 2014/0032855 A1* | 1/2014 | Shinozaki | G06F 12/0804 |
| | | | 711/142 |
| 2014/0195737 A1* | 7/2014 | Lilly | G06F 12/0891 |
| | | | 711/122 |
| 2015/0293699 A1* | 10/2015 | Bromley | G06F 3/067 |
| | | | 711/161 |

* cited by examiner

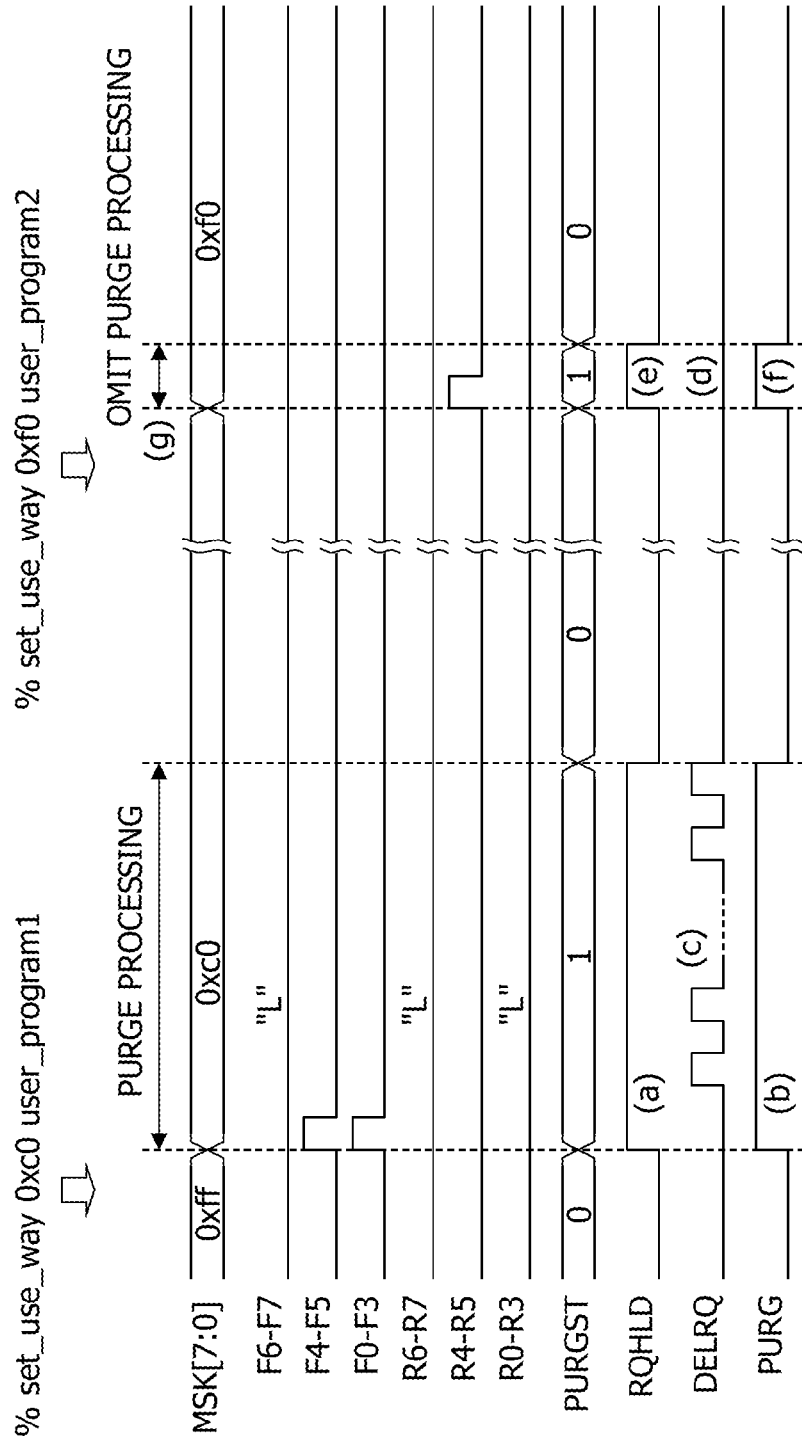

PROCESSOR AND METHOD

CROSS-REFERENCE TO RELATED APPLICATION

This application is based upon and claims the benefit of priority of the prior Japanese Patent Application No. 2015-160447, filed on Aug. 17, 2015, the entire contents of which are incorporated herein by reference.

FIELD

The embodiments disclosed herein relate to a processor, and a method.

BACKGROUND

The speed of data processing of an arithmetic processing device such as a central processing unit (CPU) is increased by providing the arithmetic processing device with a cache memory that retains a part of information stored by a main storage device. A cache memory storing instructions executed by the arithmetic processing device is referred to also as an instruction cache. A cache memory storing data processed by the arithmetic processing device is referred to also as a data cache.

A method has been proposed which uses one of a plurality of ways and makes the way operate as a direct-mapped type in an instruction cache of a set-associative type including the ways, and which thereby reduces power consumption as compared with a case where the plurality of ways are operated. In addition, a method has been proposed which stops the operation of a way determined in advance on the basis of the execution of a dedicated instruction in an instruction cache of a set-associative type, and which thereby reduces power consumption as compared with a case where all of ways are operated. Incidentally, the instructions retained in the instruction cache are not rewritten, so that coherency (consistency) between the instructions retained by the instruction cache and the instructions retained by the main storage device is maintained.

Further, a method has been proposed which switches a given number of a plurality of ways to an on-chip memory use on the basis of an instruction by a program, and thereby makes effective use of the cache memory according to the characteristic of the program. Data retained by the ways to be used as an on-chip memory is written back to a main storage device before the ways are switched to the on-chip memory.

As examples of the related art, Japanese Laid-open Patent Publication No. 2003-131945, Japanese Laid-open Patent Publication No. 2000-298618, and Japanese Laid-open Patent Publication No. 2008-310465 are known.

When data is rewritten in a cache memory, coherency between data retained by the cache memory and data retained by a main storage device is not maintained. In a cache memory of a set-associative type, when the operation of a given number of a plurality of ways is stopped to reduce power consumption, data retained in the ways to be stopped from operating is deleted. A part of the deleted data which part has been rewritten in the cache memory is written back to the main storage device to maintain the coherency. However, when a memory access request for deleted data occurs before the data rewritten in the cache memory is written back to the main storage device, old data before the writing back may be transferred from the main storage device to the cache memory.

SUMMARY

According to an aspect of the embodiment, a processor includes an arithmetic processing circuit configured to execute an instruction, a cache memory including a plurality of ways, a usage information register configured to store usage information indicating whether to use each of the plurality of ways, a purge control circuit configured to perform purge processing on a basis of rewriting of the usage information within the usage information register according to the instruction executed by the arithmetic processing circuit, the purge processing including processing of deleting, from the cache memory, target data retained in a target way to be stopped from being used among the plurality of ways and processing of writing back part of the target data, the part of the target data being data rewritten in the cache memory, to a main memory at a lower level than the cache memory, an access control circuit configured to control accessing the cache memory on a basis of a memory access request received from the arithmetic processing circuit and status of the purge processing, and a power control circuit configured to stop operation of the target way on a basis of the usage information retained by the usage information register after completion of the purge processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 is a diagram illustrating an example of operation of the arithmetic processing device illustrated in FIG. 18.

DESCRIPTION OF EMBODIMENTS

It is an object of one aspect of an embodiment to maintain coherency in a case where the power consumption of an arithmetic processing device is reduced by stopping the operation of ways not to be used. An embodiment will hereinafter be described with reference to the drawings.

Figure 1:
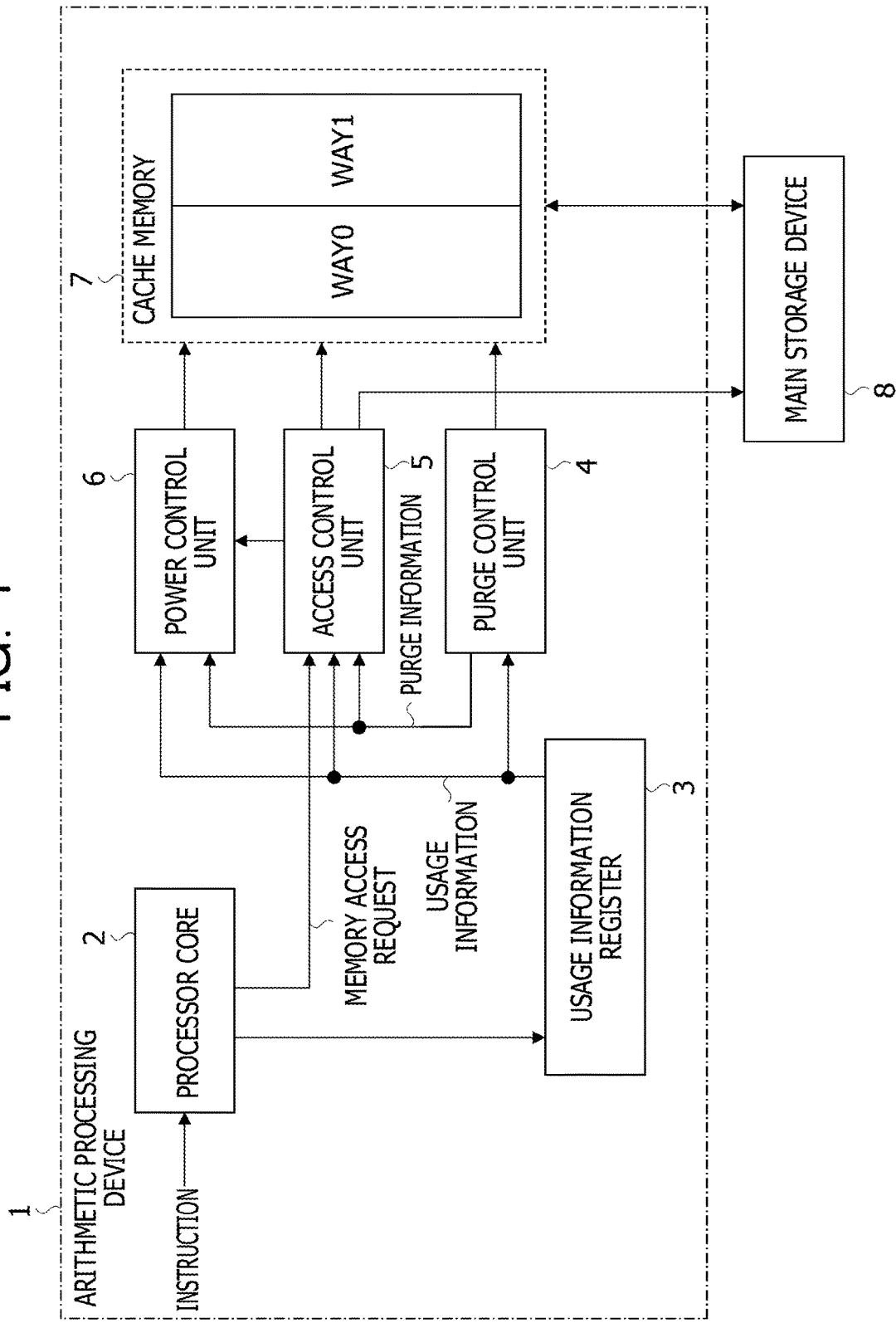
FIG. 1 is a diagram illustrating one embodiment of an arithmetic processing device, a control method of the arithmetic processing device, and a control program of the arithmetic processing device.

FIG. 1 illustrates one embodiment of an arithmetic processing device, a control method of the arithmetic processing device, and a control program of the arithmetic processing device. An arithmetic processing device 1 illustrated in FIG. 1 is a processor such as a CPU. The arithmetic processing device 1 includes a processor core 2, a usage information register 3, a purge control unit 4, an access control unit 5, a power control unit 6, and a cache memory 7.

The processor core 2 is an example of an arithmetic processing unit that executes an operation instruction, and which outputs a memory access request to the access control unit 5 on the basis of a memory access instruction such as a load instruction or a store instruction. In addition, the processor core 2 executes an instruction to rewrite usage information stored in the usage information register 3 (for example a store instruction). The usage information register 3 retains the usage information indicating whether or not to use each of a plurality of ways WAY (WAY0 and WAY1) of the cache memory 7.

The arithmetic processing device 1 for example generates a process on the basis of a system call to generate the process as a program execution unit. When the argument of the system call includes usage information to be stored in the usage information register 3, the arithmetic processing device 1 retains the usage information included in the argument as the context of the process to be generated (as a state of the arithmetic processing device 1) in a context area. When the argument of the system call does not include usage information to be stored in the usage information register 3, the arithmetic processing device 1 retains default usage information as the context of the process to be generated in the context area for storing the context. The context area is assigned to a main storage device 8 or the like. The main storage device may be a main memory. The arithmetic processing device 1 then sets, in the usage information register 3, the usage information retained as the context in the context area on the basis of the system call.

The default usage information for example indicates the use of the whole of the ways WAY0 and WAY1. A program such as an operating system (OS) performs the processing of retaining the usage information as the context and setting the usage information retained as the context in the usage information register 3 on the basis of the system call. That is, the control method of the arithmetic processing device 1 and the control program of the arithmetic processing device 1 implement the processing of retaining the usage information as the context and setting the usage information retained as the context in the usage information register 3 on the basis of the system call.

When the argument of the system call includes no usage information, the default usage information is retained as the context of the process. It is thus possible to suppress for example improper usage information indicating the use of neither of the ways WAY from being set in the usage information register 3. It is thereby possible to suppress a setting that causes no data to be retained in the cache memory 7, and thus suppress a decrease in processing efficiency of the generated process.

The purge control unit 4 determines a way WAY to be stopped from being used on the basis of the usage information within the usage information register 3 rewritten by an instruction executed by the processor core 2. The purge control unit 4 then performs purge processing including processing of deleting data retained by the way WAY to be stopped from being used from the cache memory 7 and processing of writing back the deleted data to the main storage device 8. The writing back of the data to the main storage device 8 is performed in a case where the deleted data has been rewritten in the cache memory 7. The main storage device 8 is an example of a storage device at a lower level than the cache memory 7. The purge control unit 4 outputs purge information to the access control unit 5 and the power control unit 6 while performing the purge processing. Incidentally, the purge control unit 4 may perform the purge processing via the access control unit 5.

The access control unit 5 accesses the cache memory 7 on the basis of a memory access request from the processor core 2. When the cache memory 7 does not retain access target data (cache miss), the access control unit 5 accesses the main storage device 8. In this case, on the basis of the usage information stored in the usage information register 3, the access control unit 5 accesses a way WAY being used, but does not access a way WAY stopped from being used. In addition, while the access control unit 5 is receiving the purge information (that is, during the purge processing), the access control unit 5 suppresses access to the cache memory 7 based on a memory access request from the processor core 2.

The arithmetic processing device 1 illustrated in FIG. 1 suppresses access to the cache memory 7 based on a new memory access request until the data included in the way WAY from which to delete the data is written back to the main storage device 8. It is thus possible to suppress reading of old data from the main storage device 8 based on a new memory access request (cache miss). That is, by suspending access to the cache memory 7 based on a memory access request during the purge processing, it is possible to suppress transfer of old data corresponding to dirty data rewritten in the cache memory 7 from the main storage device 8 to the cache memory 7. This makes it possible to maintain coherency between the cache memory 7 and the main storage device 8, and thus suppress an erroneous operation of the arithmetic processing device 1.

When access to the cache memory 7 is not suppressed during the purge processing, on the other hand, the coherency between the cache memory 7 and the main storage device 8 is not maintained. For example, a cache miss occurs when a new readout access request is issued for the address of dirty data included in the way WAY1 from which to delete the data. Because of the cache miss, the old data read from the main storage device 8 on the basis of the new readout access request is stored in the valid way WAY0 of the cache memory 7. Therefore the coherency is not maintained.

The power control unit 6 determines whether or not the purge processing is being performed on the basis of the purge information. In addition, the power control unit 6 determines the way WAY to be stopped from being used on the basis of the usage information retained in the usage information register 3, and after completion of the purge processing by the purge control unit 4, the power control unit 6 stops the operation of the way WAY determined as a way to be stopped from being used. The power consumption of the arithmetic processing device 1 can be reduced by stopping the operation of the way WAY not being used, as compared with a case where the operation of the way WAY not being used is not stopped.

The cache memory 7 for example operates in synchronism with a clock. The power control unit 6 stops the operation of the way WAY to be stopped from being used by stopping the supply of the clock to the way WAY, or stops the operation of the way WAY to be stopped from being used by stopping the supply of power to the way WAY. Further, the power control unit 6 may stop both of the supply of the clock and the supply of power to the way WAY to be stopped from being used.

The cache memory 7 is for example a data cache. The cache memory 7 includes a plurality of ways WAY (WAY0 and WAY1) that store a part of data stored by the main storage device 8 coupled to the arithmetic processing device 1. Each of the ways WAY includes a plurality of storage areas that each retain data read from the main storage device 8. Incidentally, the number of ways WAY may be three or more. In addition, the cache memory 7 may store both of data processed by the processor core 2 and instructions (instruction codes) executed by the processor core 2. In addition, when there is a possibility of instruction codes being rewritten in the cache memory 7, the cache memory 7 may store the instruction codes.

As described above, the embodiment illustrated in FIG. 1 can maintain the coherency between the cache memory 7 and the main storage device 8 in the case where the power consumption of the arithmetic processing device 1 is reduced by stopping the operation of a way WAY not to be used. In addition, when the argument of a system call does not include usage information to be stored in the usage information register 3, the default usage information is retained as the context of the process. It is therefore possible to suppress the retention of an improper setting as the context. As a result, a decrease in processing efficiency of the generated process can be suppressed.

Figure 2:
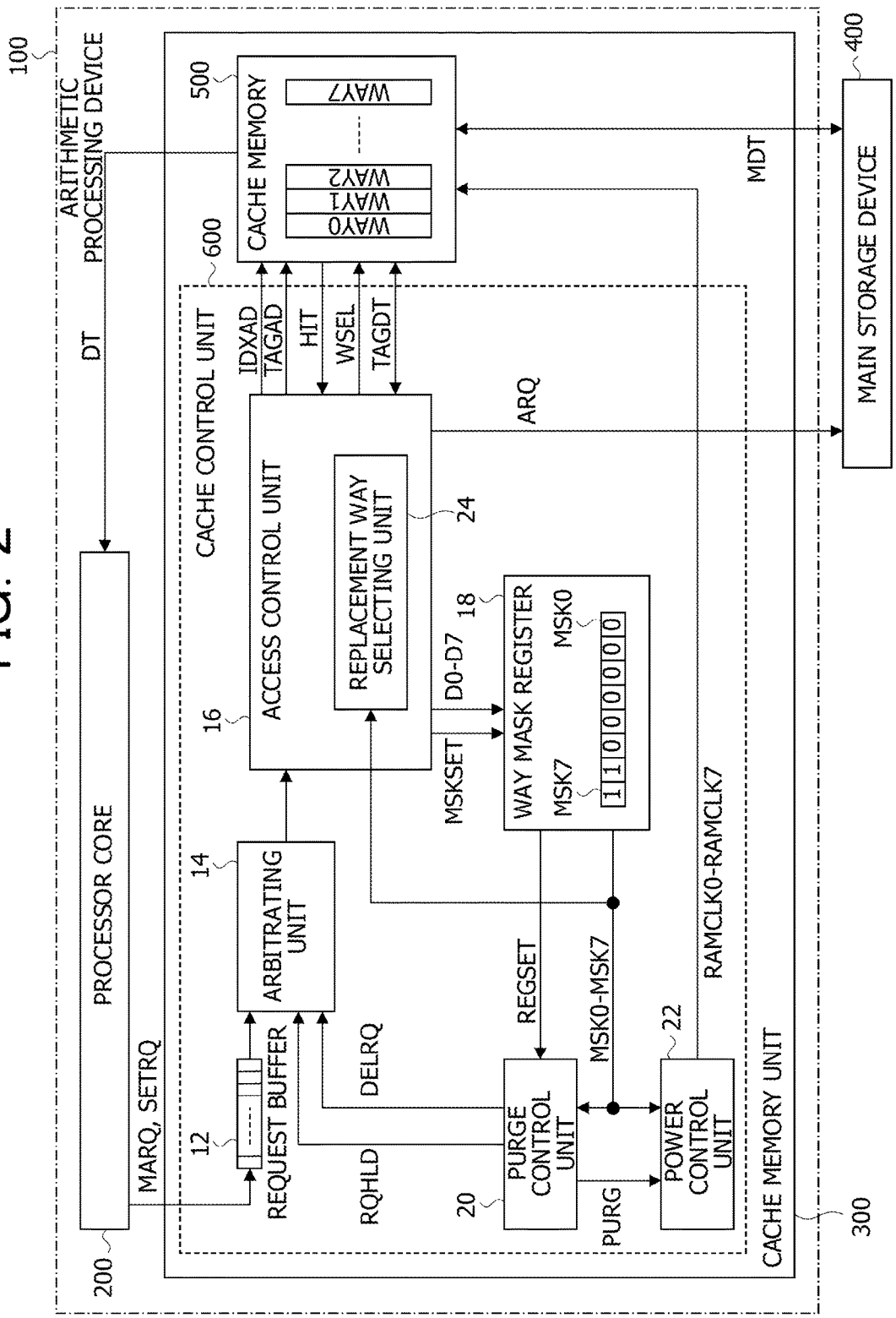
FIG. 2 is a diagram illustrating another embodiment of an arithmetic processing device, a control method of the arithmetic processing device, and a control program of the arithmetic processing device.

FIG. 2 illustrates another embodiment of an arithmetic processing device, a control method of the arithmetic processing device, and a control program of the arithmetic processing device. An arithmetic processing device 100 illustrated in FIG. 2 is a processor such as a CPU. The arithmetic processing device 100 includes a processor core 200 and a cache memory unit 300. The arithmetic processing device 100 is included in an information processing device together with a main storage device 400. Incidentally, the main storage device 400 may be coupled to the arithmetic processing device 100 via a memory control device. The main storage device 400 is an example of a storage device at a lower level than a cache memory 500.

The cache memory unit 300 includes the cache memory 500 and a cache control unit 600 that controls the operation of the cache memory 500. The cache memory 500 may store data processed by the processor core 200, or may store both of the data processed by the processor core 200 and instructions (instruction codes) executed by the processor core 200. In addition, when there is a possibility of instruction codes being rewritten in the cache memory 500, the cache memory 500 may store the instruction codes.

Figure 3:
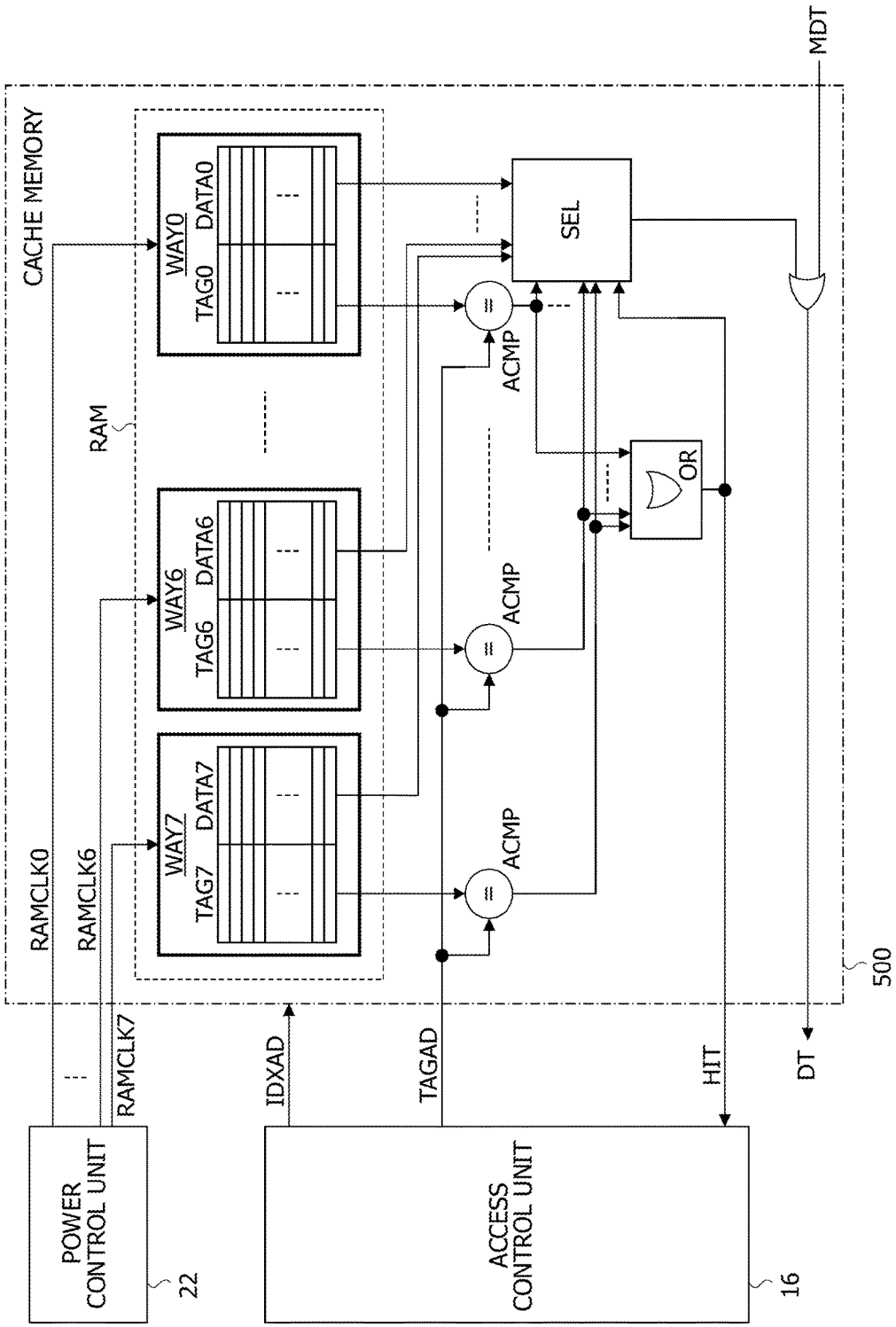
FIG. 3 is a diagram illustrating an example of principal parts of a cache memory illustrated in FIG. 2.

The cache memory 500 includes ways WAY (WAY0 to WAY7) that operate in synchronism with clocks RAMCLK (RAMCLK0 to RAMCLK7), respectively. In addition, the cache memory 500 includes a plurality of entries identified by an index address IDXAD indicated by a middle-order bit group of an address output from the processor core 200. As illustrated in FIG. 3, each entry includes a tag area TAG (TAG0 to TAG7) and a data area DATA (DATA0 to DATA7) in each of the ways WAY (WAY0 to WAY7). Incidentally, it suffices for the number of ways WAY of the cache memory 500 to be two or more.

The cache control unit 600 includes a request buffer 12, an arbitrating unit 14, an access control unit 16, a way mask register 18, a purge control unit 20, and a power control unit 22.

The request buffer 12 sequentially retains a memory access request MARQ output from the processor core 200 or a set request SETRQ of the way mask register 18, and outputs the retained requests MARQ and SETRQ to the arbitrating unit 14. Incidentally, the arithmetic processing device 100 may include a plurality of processor cores 200. In this case, the cache control unit 600 includes a request buffer for each of the plurality of processor cores 200. The cache control unit 600 may also include a request buffer that retains a memory access request supplied from the outside of the arithmetic processing device 100.

The arbitrating unit 14 arbitrates the memory access request MARQ and the set request SETRQ received from the request buffer 12 and a deletion request DELRQ received from the purge control unit 20. The arbitrating unit 14 outputs either the memory access request MARQ, the set request SETRQ, or the deletion request DELRQ that is selected by the arbitration to the access control unit 16. The set request SETRQ is for example generated when the processor core 200 executes a store instruction to write a bit value in the way mask register 18.

While the arbitrating unit 14 is receiving a request suppression signal RQHLD from the purge control unit 20, the arbitrating unit 14 stops the arbitration of the memory access request MARQ received from the request buffer 12, and suppresses the output of the memory access request MARQ to the access control unit 16. That is, while the request suppression signal RQHLD is output, access to the cache memory 500 which access is involved in the memory access request MARQ is suppressed.

In addition, the arbitrating unit 14 outputs, to the access control unit 16, the deletion request DELRQ received from the purge control unit 20 while the arbitrating unit 14 is receiving the request suppression signal RQHLD. The deletion request DELRQ is generated to, when a given number of ways WAY of the cache memory 500 are to be stopped from being used, delete data retained by the ways WAY to be stopped from being used. When the data deleted from a way WAY has been rewritten in the cache memory 500, the deleted data is written back to the main storage device 400. Incidentally, the arbitrating unit 14 may be disposed within the access control unit 16. That is, the access control unit 16 may have the functions of the arbitrating unit 14.

The access control unit 16 includes a replacement way selecting unit 24. The access control unit 16 outputs, to the cache memory 500, an address included in the memory access request MARQ received from the arbitrating unit 14 as an index address IDXAD and a tag address TAGAD. The tag address TAGAD is indicated by a high-order bit group of the address output from the processor core 200. The tag address TAGAD is stored in a tag area TAG (FIG. 3) in an entry indicated by the index address IDXAD.

When the access control unit 16 receives a hit signal HIT from the cache memory 500, the access control unit 16 determines that the cache memory 500 stores data corresponding to the address included in the memory access request MARQ (cache hit). When a cache hit is determined for a memory access request MARQ to read the data, the data DT read from the cache memory 500 is output to the processor core 200. When the cache hit is determined for a memory access request MARQ to write data, the access control unit 16 writes the data to a data area DATA (FIG. 3) of a way WAY for which the cache hit is determined. In addition, the access control unit 16 writes, to a tag area TAG of the way WAY in which the cache hit has occurred, information indicating that the data written to the data area DATA is different from the original data stored in the main storage device 400.

When the access control unit 16 does not receive the hit signal HIT, on the other hand, the access control unit 16 determines that the cache memory 500 does not store the data corresponding to the address included in the memory access request MARQ (cache miss). When the cache miss is determined, the access control unit 16 outputs a memory access request ARQ (readout request) corresponding to the memory access request MARQ to the main storage device 400. In addition, by using the replacement way selecting unit 24, the access control unit 16 determines a way WAY that retains data to be replaced with data to be read from the main storage device 400 among ways WAY (data areas DATA) within entries indicated by the index address IDMD.

The access control unit 16 reads tag data TAGDT retained in a tag area TAG corresponding to a data area DATA retaining the data to be replaced, and determines whether or not the data to be replaced has been rewritten in the cache memory 500 on the basis of the tag data TAGDT. When the data to be replaced has been rewritten in the cache memory 500, the access control unit 16 outputs, to the main storage device 400, a memory access request ARQ (writing request) to write back the data to be replaced (that is, the data to be expelled) to the main storage device 400. The access control unit 16 then writes the tag data TAGDT indicating that the data area DATA is invalid to the tag area TAG corresponding to the data to be expelled.

The access control unit 16 writes data MDT read from the main storage device 400 on the basis of the memory access request ARQ (readout request) to the data area DATA from which the data is expelled. In addition, the access control unit 16 writes information indicating that the data is valid and information indicating that the data is not rewritten in the cache memory 500 to the tag area TAG corresponding to the data area DATA to which the data is written.

In a case where the memory access request MARQ is a writing request, the access control unit 16 merges writing data received from the arbitrating unit 14 into the data MDT, and thereafter writes the merged data MDT to the data area DATA from which the data is expelled. In a case where the memory access request MARQ is a readout request, the cache memory 500 outputs data requested by the memory access request MARQ, the requested data being included in the data MDT, to the processor core 200. Incidentally, the way WAY in which the data MDT is read and written is selected by a way selection signal WSEL generated by the access control unit 16.

When the access control unit 16 receives the deletion request DELRQ from the arbitrating unit 14, on the other hand, the access control unit 16 performs processing of deleting data stored in a data area DATA indicated by the number of a way WAY and an index address IDXAD that are included in the deletion request DELRQ. The data is deleted by writing, to a tag area TAG corresponding to the data area DATA, information indicating that the data stored in the data area DATA is invalid. In addition, when the deleted data is found to have been rewritten in the cache memory 500 on the basis of information stored in the tag area TAG, the access control unit 16 outputs a memory access request ARQ (writing request) to the main storage device 400 and writes back the deleted data to the main storage device 400.

Further, when the access control unit 16 receives the set request SETRQ from the arbitrating unit 14, the access control unit 16 generates a mask set signal MSKSET, and outputs bit values D0 to D7 included in the set request SETRQ in synchronism with the mask set signal MSKSET. The way mask register 18 is thereby rewritten. The way mask register 18 retains the bit values D0 to D7 as mask bits MSK0 to MSK7. Incidentally, the mask bits MSK0 to MSK7 of the way mask register 18 may be rewritten by the arbitrating unit 14 that receives the set request SETRQ or another control unit without the intervention of the access control unit 16.

The replacement way selecting unit 24 identifies ways WAY being used and ways WAY stopped from being used on the basis of the value of the mask bits MSK0 to MSK7 retained in the way mask register 18. The replacement way selecting unit 24 then determines a way WAY in which to replace data at a time of a cache miss from among the ways WAY being used. When there are a plurality of ways WAY in which the replacement is possible, the replacement way selecting unit 24 determines a way WAY in which to replace data on the basis of a least recently used (LRU) method, which sets data that has not been referred to for a longest time as an object for replacement, or the like.

Figure 12:
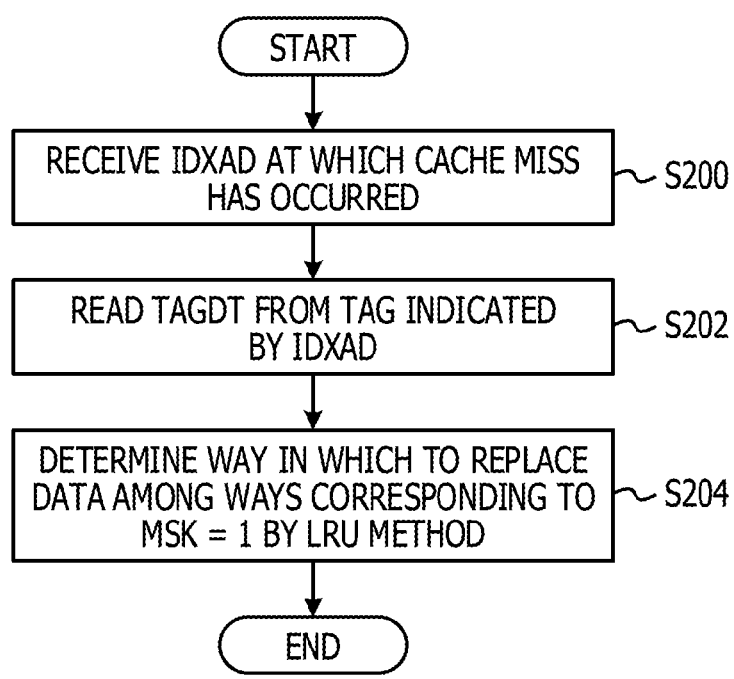
FIG. 12 is a diagram illustrating an example of operation of a replacement way selecting unit illustrated in FIG. 2.

LRU information for LRU determination is retained within a tag area TAG (FIG. 3) in each entry. The LRU information retained within tag areas TAG in respective entries includes information indicating times for which respective pieces of data area DATA in the respective entries in the ways WAY being used have not been referred to. Thus, even when there are ways WAY not used so as to correspond to the value of the mask bits MSK0 to MSK7, a way WAY in which to replace data can be determined on the basis of the LRU method. As a result, it is possible to suppress a way WAY stopped from being used from being set as an object for data replacement, and therefore possible to suppress an erroneous operation of the arithmetic processing device 100. Incidentally, the LRU information for the LRU determination may be retained in a storage area that is different from the cache memory 500 and which can be referred to by the replacement way selecting unit 24. An example of operation of the replacement way selecting unit 24 is illustrated in FIG. 12. Incidentally, the replacement way selecting unit 24 may be disposed outside the access control unit 16.

The way mask register 18 retains the bit values D0 to D7 received together with the mask set signal MSKSET as the mask bits MSK0 to MSK7 on the basis of the mask set signal MSKSET. The way mask register 18 is for example assigned to a memory space accessed in a kernel mode. The mask bits MSK0 to MSK7 respectively correspond to the ways WAY0 to WAY7 of the cache memory 500. A mask bit of "1" indicates a way WAY being used. A mask bit of "0" indicates a way WAY stopped from being used. The example illustrated in FIG. 2 represents a state in which the ways WAY6 and WAY7 are used and the ways WAY0 to WAY5 are stopped from being used.

Figure 5:
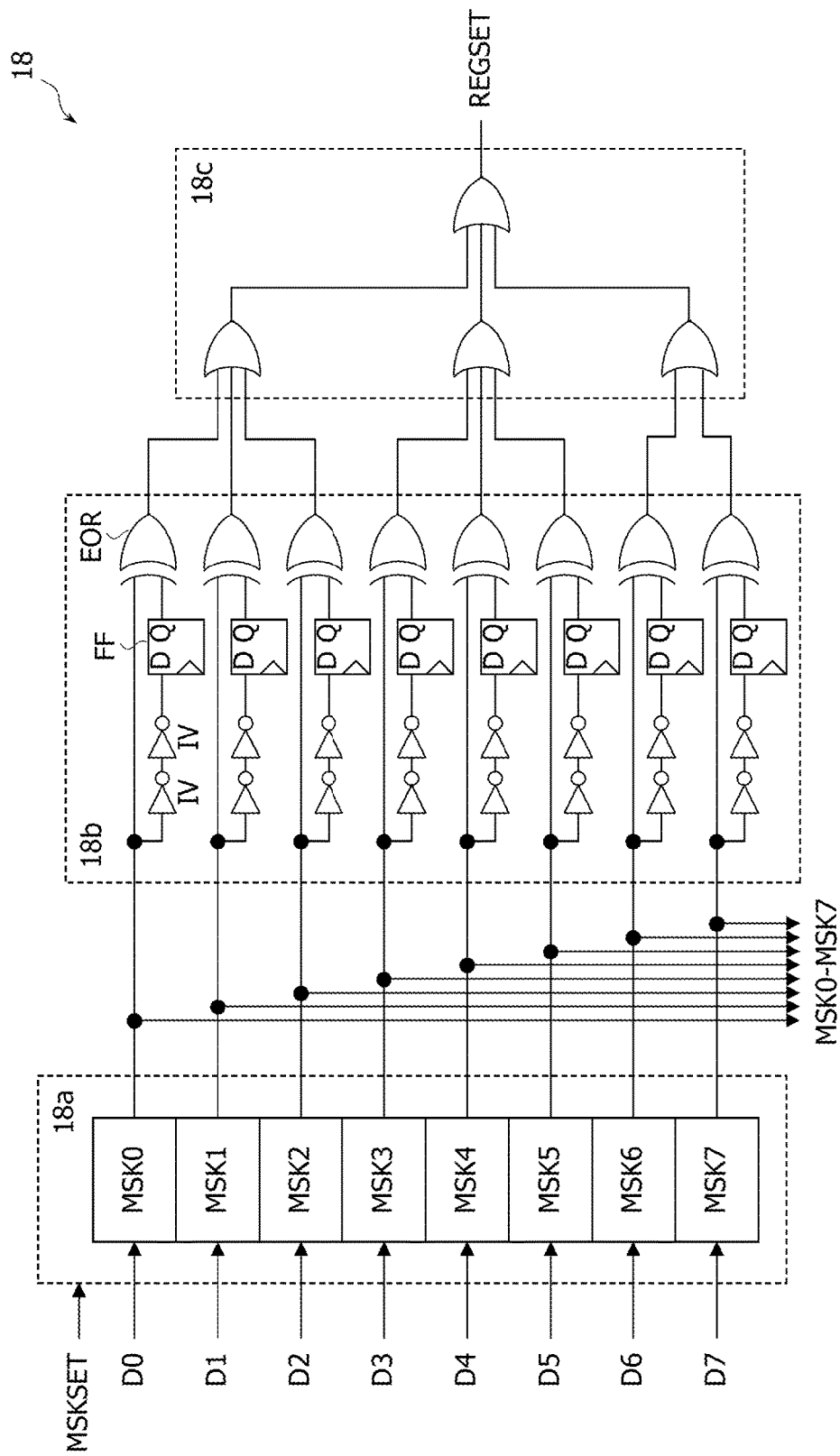
FIG. 5 is a diagram illustrating an example of a way mask register illustrated in FIG. 2.

The way mask register 18 outputs the retained mask bits MSK0 to MSK7 to the purge control unit 20, the power control unit 22, and the replacement way selecting unit 24. In addition, when the way mask register 18 detects that the logical value of at least one of the mask bits MSK0 to MSK7 is inverted, the way mask register 18 outputs a change signal REGSET to the purge control unit 20. An example of the way mask register 18 is illustrated in FIG. 5. The way mask register 18 is an example of a usage information register. The value of the mask bits MSK0 to MSK7 is an example of usage information indicating whether or not to use each of the ways WAY0 to WAY7.

When the purge control unit 20 receives the change signal REGSET, the purge control unit 20 outputs a request suppression signal RQHLD, a deletion request DELRQ, and a purge signal PURG on the basis of the value of the mask bits MSK0 to MSK7 retained by the way mask register 18. An example of operation of the purge control unit 20 will be described with reference to FIG. 10 and FIG. 11. Incidentally, the purge control unit 20 may output the purge signal PURG to the arbitrating unit 14 in place of the request suppression signal RQHLD. The request suppression signal RQHLD and the purge signal PURG are an example of purge information indicating that purge processing is being performed, the purge processing being processing of deleting data retained by a way WAY to be stopped from being used and writing back the data to the main storage device 400.

Figure 6:
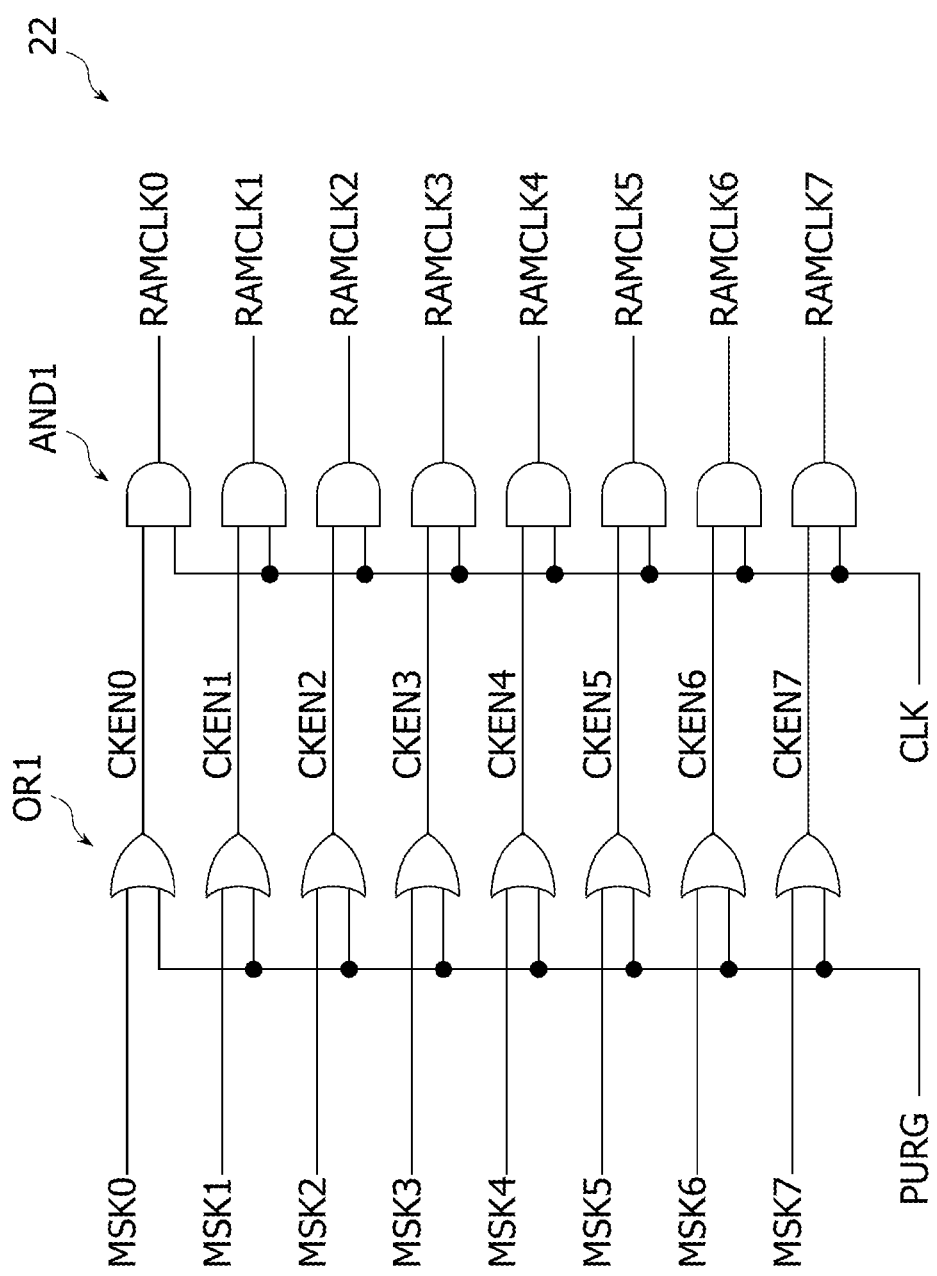
FIG. 6 is a diagram illustrating an example of a power control unit illustrated in FIG. 2.

The power control unit 22 controls generation and stopping of clocks RAMCLK (RAMCLK0 to RAMCLK7) supplied to the cache memory 500 on the basis of the mask bits MSK0 to MSK7 and the purge signal PURG from the purge control unit 20. The clocks RAMCLK0 to RAMCLK7 are respectively supplied to the ways WAY0 to WAY7 of the cache memory 500 (FIG. 3). An example of the power control unit 22 is illustrated in FIG. 6. Incidentally, the power control unit 22 may be disposed outside the cache control unit 600 or the cache memory unit 300.

FIG. 3 illustrates an example of principal parts of the cache memory illustrated in FIG. 2. FIG. 3 mainly illustrates elements related to the determination of a cache hit and a cache miss and the reading of data from a data area DATA at a time of the cache hit.

The cache memory 500 adopts an eight-way set-associative system. The cache memory 500 includes a random access memory (RAM) including a plurality of ways WAY (eight ways WAY0 to WAY7 in the present example). Each way WAY includes tag areas TAG (TAG0 to TAG7) and data areas DATA (DATA0 to DATA7). Each way WAY for example includes 256 entries identified on the basis of an index address IDXAD obtained by extracting 8 middle-order bits [13:6] of an address output from the processor core 200.

In the following description, entries selected by the common index address IDXAD in the ways WAY0 to WAY7 are referred to also as a set.

Each way WAY operates in synchronism with the corresponding clock RAMCLK (RAMCLK0 to RAMCLK7), and stops operating when the clock RAMCLK is stopped. That is, each way WAY receives the clock RAMCLK independently of the others, and operates independently of the others.

A data area DATA in each entry retains data DT of 64 bytes. The data DT of 64 bytes is an access unit of data read from and written to the main storage device 400. Each data area DATA is referred to also as a cache block or a cache line. A tag area TAG in each entry retains a tag address TAGAD, which is a part (given number of high-order bits) of an address in the main storage device 400 of the data retained in the data area DATA, and control information indicating the state of the data retained in the data area DATA. The control information for example includes information indicating whether the data stored in the data area DATA is valid or invalid and information indicating whether or not the data stored in the data area DATA has been rewritten after being transferred from the main storage device 400.

The cache memory 500 includes an address comparator ACMP corresponding to each way WAY, an OR circuit OR, and a selector SEL. The address comparator ACMP compares a tag address TAGAD as high-order bits of an address included in a memory access request MARQ with a tag address read from a tag area TAG on the basis of an index address IDMD. The address comparator ACMP outputs a result of the comparison of the tag addresses to the OR circuit OR and the selector SEL.

When one of the comparison results output from the address comparators ACMP indicates a match of a tag address, the OR circuit OR generates a hit signal HIT, and outputs the hit signal HIT to the access control unit 16 and the selector SEL. When the selector SEL receives the hit signal HIT, the selector SEL selects data output from the data area DATA of the way WAY corresponding to the address comparator ACMP that outputs the information indicating the match of the tag address, and outputs the data as data DT. The data DT selected by the selector SEL is output to the processor core 200. Incidentally, data requested by a memory access request in data MDT read from the main storage device 400 (FIG. 2) at a time of a cache miss is also output as data DT to the processor core 200.

Figure 4:
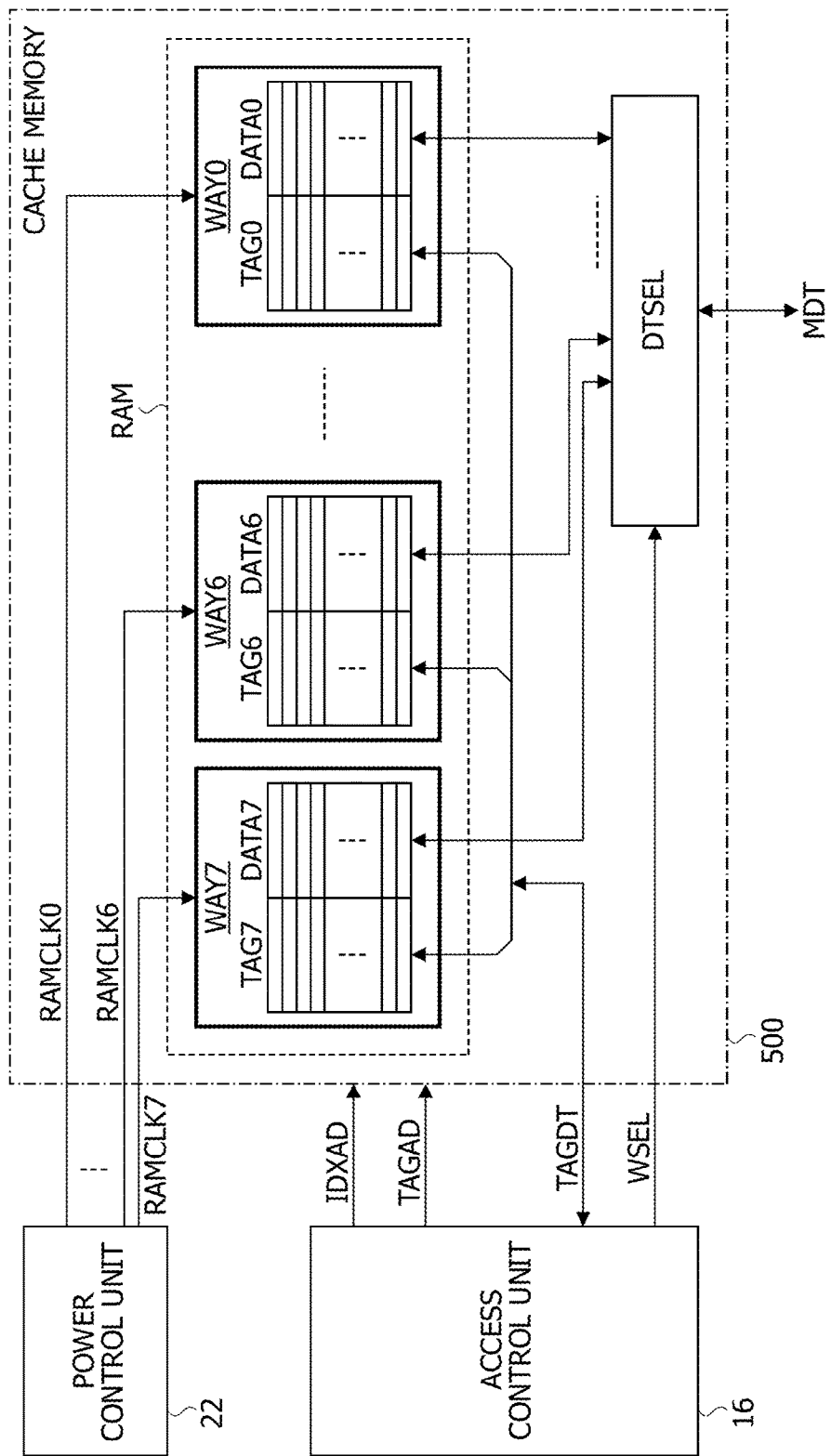
FIG. 4 is a diagram illustrating an example of other principal parts of the cache memory illustrated in FIG. 2.

FIG. 4 illustrates an example of other principal parts of the cache memory illustrated in FIG. 2. In order to facilitate understanding of description, the RAM and the clocks RAMCLK0 to RAMCLK7 are duplications of those in FIG. 3. FIG. 4 mainly illustrates elements related to access to tag areas TAG, the writing back of data from a data area DATA to the main storage device 400 at a time of a cache miss, and the writing of data to the data area DATA at the time of the cache miss.

When the access control unit 16 accesses tag areas TAG, the access control unit 16 outputs an index address IDXAD to the cache memory 500, and reads or writes tag data TAGDT. In FIG. 4, the tag data TAGDT is input to or output from all of the tag areas TAG in parallel. However, a tag area TAG to be accessed may be specified by a chip select signal or the like, and the tag data TAGDT may be input to or output from each tag area TAG.

When the access control unit 16 writes back data to the main storage device 400, the access control unit 16 outputs, to the cache memory 500, an index address IDXAD and a way selection signal WSEL selecting a way WAY including a data area DATA retaining the data to be written back. The RAM of the cache memory 500 outputs data retained by entries selected by the index address IDXAD in the data areas DATA in the respective ways WAY. A data selector DTSEL of the cache memory 500 selects the data output from the data area DATA in the way WAY indicated by the way selection signal WSEL, and outputs the selected data as data MDT to the main storage device 400.

Incidentally, the access control unit 16 determines from which way WAY to expel retained data at a time of a cache miss using the replacement way selecting unit 24 on the basis of the LRU information retained in tag areas TAG. The way WAY from which to expel data is determined on the basis of the LRU information retained in the tag areas TAG of ways WAY corresponding to mask bits MSK set to "1." The access control unit 16 writes, to a tag area TAG corresponding to a data area DATA from which data is expelled, information indicating that the data retained in the data area DATA is invalid.

In addition, the access control unit 16 determines whether or not to write back the data expelled from the data area DATA to the main storage device 400 on the basis of a modify bit retained in the tag area TAG, for example. The writing back is performed when the modify bit indicates that the data retained in the data area DATA has been rewritten. The writing back is not performed when the modify bit indicates that the data retained in the data area DATA has not been rewritten (that is, the data retained in the data area DATA is the same as the data stored in the main storage device 400).

When the access control unit 16 writes data MDT read from the main storage device 400 to the RAM, the access control unit 16 outputs, to the cache memory 500, an index address IDXAD and a way selection signal WSEL indicating a way WAY in which to write the data. The data selector DTSEL outputs the data MDT read from the main storage device 400 to the data areas DATA of the way WAY indicated by the way selection signal WSEL. The RAM writes the data output from the data selector DTSEL to the data area DATA of the way WAY indicated by the way selection signal WSEL in the set selected by the index address IDMD. Then, the processing of replacing the data retained in the cache memory 500 is performed by the writing back of the data from the cache memory 500 to the main storage device 400 and the writing of the data from the main storage device 400 to the cache memory 500.

FIG. 5 illustrates an example of the way mask register illustrated in FIG. 2. The way mask register 18 includes a register unit 18a, a pulse generating unit 18b, and a signal generating unit 18c. The register unit 18a includes a plurality of storage units that retain data D0 to D7 as mask bits MSK0 to MSK7 in synchronism with a mask set signal MSKSET from the access control unit 16 illustrated in FIG. 2. The register unit 18a also outputs the retained mask bits MSK0 to MSK7 as mask bit signals MSK0 to MSK7.

The pulse generating unit 18b includes a pair of inverters IV coupled in series with each other, a flip-flop FF, and an exclusive logical add (OR) gate EOR in correspondence with each of the mask bit signals MSK0 to MSK7. Each exclusive OR gate EOR receives the respective mask bit signals MSK0 to MSK7 and a signal obtained by delaying the respective mask bit signals MSK0 to MSK7 by one clock cycle by the flip-flop FF, and outputs a high level in a period in which the two received signals are different in logic from each other. That is, the pulse generating unit 18b generates pulse signals having a high level when the respective mask bits MSK0 to MSK7 are inverted in logic. The signal generating unit 18c includes a plurality of OR gates. The signal generating unit 18c outputs a change signal REGSET having a high-level pulse when at least one of the exclusive OR gates of the pulse generating unit 18b outputs a pulse signal. Incidentally, the pulse generating unit 18b and the signal generating unit 18c may be provided outside the way mask register 18.

FIG. 6 illustrates an example of the power control unit illustrated in FIG. 2. The power control unit 22 includes OR circuits OR1 and AND circuits AND1 each corresponding to the mask bit MSK (MSK0 to MSK7). Each OR circuit OR1 outputs a clock enable signal CKEN (CKEN0 to CKEN7) having a high level when the value of the mask bit MSK is "1," or when the purge signal PURG is at a high level. The AND circuits AND1 output clocks RAMCLK (RAMCLK0 to RAMCLK7) in synchronism with a clock CLK during a period that the clock enable signal CKEN is at the high level. Thus, when the mask bits MSK0 to MSK7 are "1," or when the purge signal PURG is at the high level, the power control unit 22 generates the respective clocks RAMCLK0 to RAMCLK7. As will be described with reference to FIG. 10, the purge signal PURG is set at the high level while the purge processing is performed, the purge processing deleting data retained in the data areas DATA of a way WAY to be stopped from being used.

Figure 7:
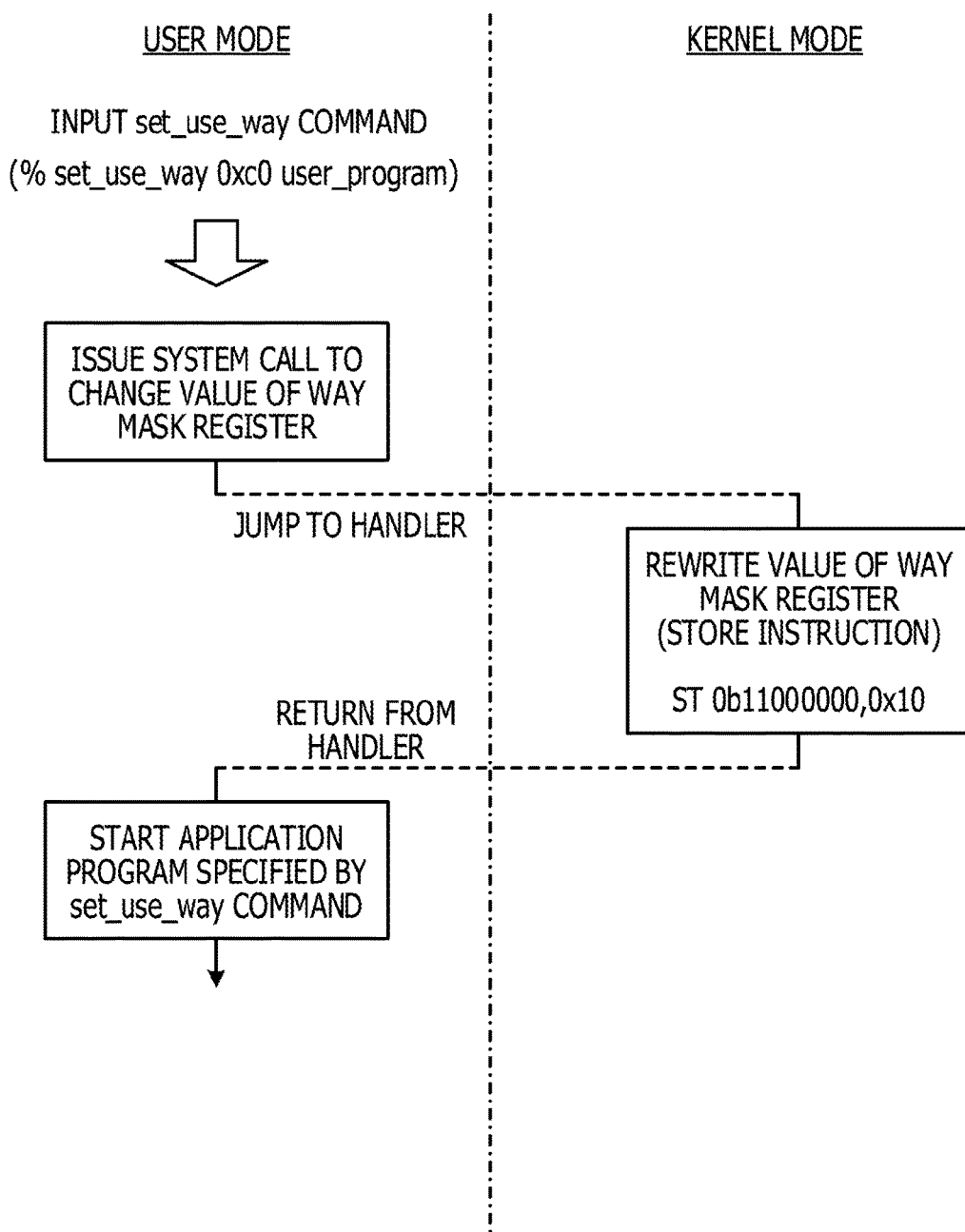
FIG. 7 is a diagram illustrating an example of processing of changing a value of the way mask register illustrated in FIG. 2 on the basis of a system call to generate a process.

FIG. 7 illustrates an example of processing of changing a value of the way mask register illustrated in FIG. 2 on the basis of a system call to generate a process. The processing illustrated in FIG. 7 is performed by a program executed by the arithmetic processing device 100. "%" illustrated in FIG. 7 denotes a command prompt displayed on the monitor of the information processing device. In FIG. 7, a code "0x" denotes a hexadecimal number, and a code "0b" denotes a binary number.

First, a user using the information processing device including the arithmetic processing device 100 inputs a set_use_way command to the information processing device. The bit value of a first argument "0xc0" of the set_use_way command indicates the use or nonuse of the ways WAY0 to WAY7, and represents the value stored in the way mask register 18. When "c0" is specified as a hexadecimal number, the mask bits MSK7 to MSK0 of the way mask register 18 are set to "11000000," which indicates that the ways WAY7 and WAY6 are used and that the ways WAY5 to WAY0 are not used. A second argument "user_program" of the set_use_way command represents the name of an application program executed by the arithmetic processing device 100.

In a user mode, for example, the arithmetic processing device 100 that is executing a control program of a system including a man-machine interface and the like issues a system call to change the value of the way mask register 18 on the basis of the input of the set_use_way command. The issuance of the system call changes the execution mode of the arithmetic processing device 100 from the user mode to a kernel mode.

The control program then jumps to a handler of the system call. The handler rewrites the value of the way mask register 18. For example, the way mask register 18 is assigned to an address 0x10 of an address space. The handler rewrites the value of the way mask register 18 by executing a store instruction (ST 0b11000000, 0x10). The value stored in the way mask register 18 is retained as a context (state of the arithmetic processing device 100), and is managed by the OS.

Because the value stored in the way mask register 18 is retained as a context, even when the process (application program) is changed, the way mask register 18 can be made to retain a correct value according to the changed process. As a result, even when the process is changed, the cache memory 500 having an optimum capacity can be used for each application program. Context processing in a case where a process is generated will be described with reference to FIG. 8. Context processing in a case where the process is changed will be described with reference to FIG. 9.

Incidentally, also in a case where the arithmetic processing device 100 includes a plurality of processor cores 200 and the processor cores 200 each execute a process corresponding to an application program, the value of the way mask register 18 can be changed by a context switch. As a result, also in an arithmetic processing device 100 of a so-called multi-core type, the cache memory having an optimum capacity can be used for each application program.

After completion of the execution of the store instruction by the handler, control is returned from the handler to the control program as the issuance source of the system call. The control program then starts the user_program (application program) specified by the second argument of the set_use_way command. Incidentally, because the number of ways WAY to be used is specified by the set_use_way command, the cache memory having an optimum capacity can be used without an instruction to change the number of ways WAY being added into the application program. That is, the cache memory 500 having an optimum capacity can be used without the application program being changed.

The user_program is for example used in a field of high performance computing (HPC) such as scientific computation. An optimum capacity of the cache memory that can maintain desired processing performance of the user_program is known on the basis of advance tuning. When an application for which an optimum capacity of the cache memory is thus known is executed, processing can be performed using a minimum number of ways WAY without decreasing the performance of the application. As a result, it is possible to maintain coherency and contribute to a reduction in power consumption of the arithmetic processing device 100 without decreasing the performance of the application.

Figure 8:
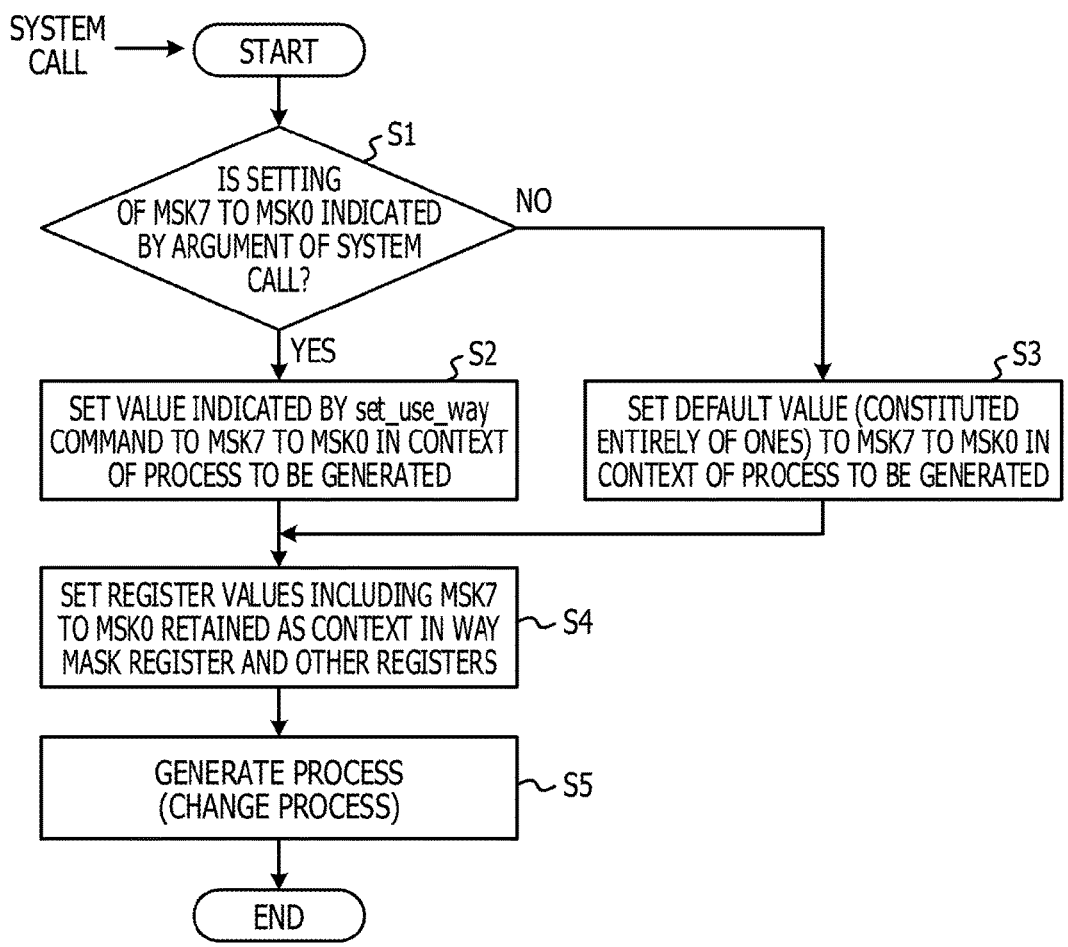
FIG. 8 is a diagram illustrating an example of processing in a case where a process is generated by a system call in the arithmetic processing device illustrated in FIG. 2.

FIG. 8 illustrates an example of processing in a case where a process is generated by a system call in the arithmetic processing device illustrated in FIG. 2. The processing illustrated in FIG. 8 is performed by the control program such as the OS that is executed by the arithmetic processing device 100 on the basis of the issuance of the system call. That is, FIG. 8 illustrates an example of the control method of the arithmetic processing device 100 and the control program of the arithmetic processing device 100.

First, in step S1, the arithmetic processing device 100 determines whether or not a setting of the mask bits MSK7 to MSK0 of the way mask register 18 is indicated by an argument used in the system call. That is, the arithmetic processing device 100 determines whether or not the system call is issued on the basis of the set_use_way command. When a setting of the mask bits MSK7 to MSK0 is indicated by the argument, the processing is shifted to step S2. When a setting of the mask bits MSK7 to MSK0 is not indicated by the argument, the processing is shifted to step S3.

In step S2, the arithmetic processing device 100 sets the value indicated by the argument of the set_use_way command to the mask bits MSK7 to MSK0 in the context of the process to be generated. The arithmetic processing device 100 then shifts the processing to step S4. In step S3, on the other hand, the arithmetic processing device 100 sets a default value (for example constituted entirely of ones) to the mask bits MSK7 to MSK0 in the context of the process to be generated. The arithmetic processing device 100 then shifts the processing to step S4. The default value constituted entirely of ones indicates that all of the ways WAY7 to WAY0 of the cache memory 500 illustrated in FIG. 3 are used.

In step S4, the arithmetic processing device 100 sets the mask bits MSK7 to MSK0 retained as the context in the way mask register 18, and sets other register values or the like retained as the context in individually corresponding registers or the like. Next, in step S5, the arithmetic processing device 100 generates the new process. That is, the process executed by the arithmetic processing device 100 is changed.

When a setting of the mask bits MSK7 to MSK0 is not indicated by the argument, the default value for using the ways WAY7 to WAY0 is retained as the context by step S3. Thus, as in the embodiment illustrated in FIG. 1, it is possible to suppress improper usage information indicating the use of none of the ways WAY from being set in the usage information register 3, and therefore possible to suppress a setting that causes no data to be retained in the cache memory 500. As a result, a decrease in processing efficiency of the generated process can be suppressed.

Figure 9:
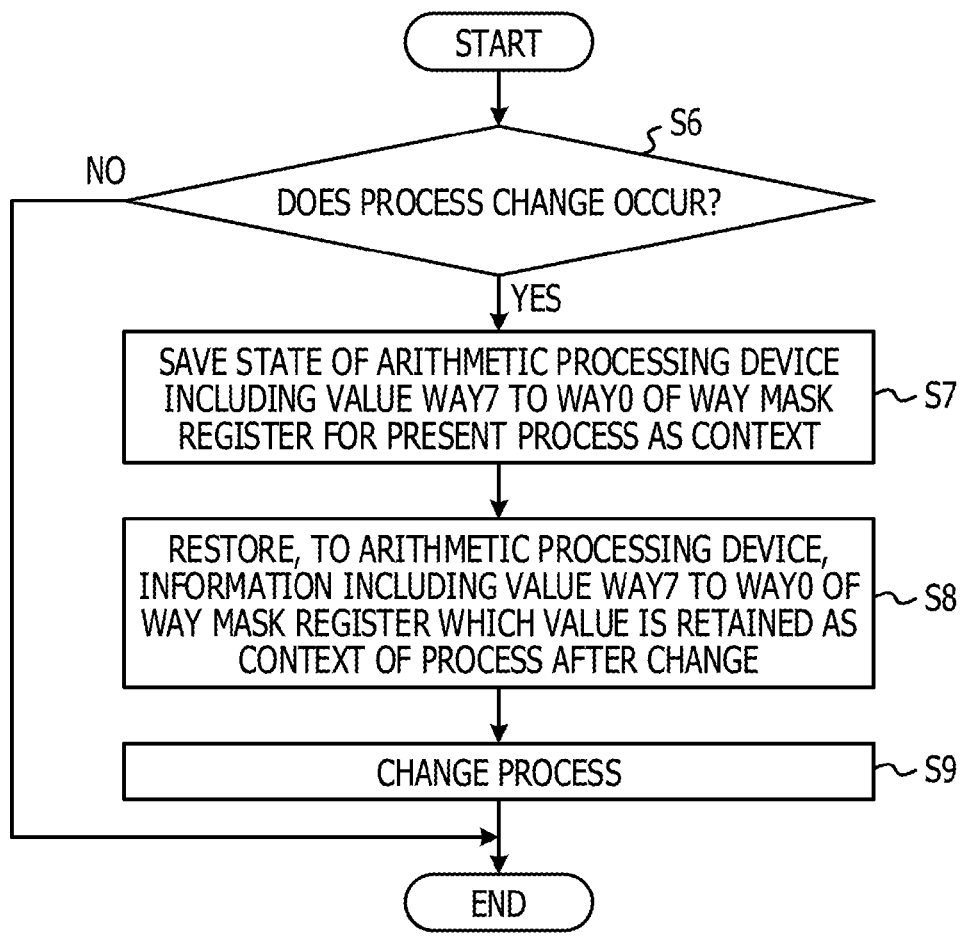
FIG. 9 is a diagram illustrating an example of context processing in a case where the arithmetic processing device illustrated in FIG. 2 changes a process.

FIG. 9 illustrates an example of context processing in a case where the arithmetic processing device illustrated in FIG. 2 changes a process. The processing illustrated in FIG. 9 is performed by a program such as the OS executed by the arithmetic processing device 100. That is, the processing illustrated in FIG. 9 is implemented by the control method of the arithmetic processing device 100 and the control program of the arithmetic processing device 100.

First, in step S6, the arithmetic processing device 100 determines whether or not a process change occurs. When a process change occurs, the arithmetic processing device 100 shifts the processing to step S7. When no process change occurs, the arithmetic processing device 100 ends the processing.

In step S7, the arithmetic processing device 100 saves the state of the arithmetic processing device 100 including the value of the mask bits MSK7 to MSK0 of the way mask register 18 for the present process as a context. Next, in step S8, the arithmetic processing device 100 restores information including the mask bits MSK7 to MSK0 of the way mask register 18 which mask bits are retained as the context of a process after the change. That is, the state of the arithmetic processing device 100 including the way mask register 18 is changed so as to correspond to the process after the change. Then, in step S9, the arithmetic processing device 100 changes the process. The arithmetic processing device 100 then ends the processing. Incidentally, as will be described with reference to FIG. 10, the purge processing including processing of deleting data and processing of writing back the data to the main storage device 400 is performed for ways WAY to be stopped from being used according to the process change.

As illustrated in FIG. 9, the value of the mask bits MSK7 to MSK0 is retained as a context for each process. Therefore, even in cases where the process is changed, the cache memory 500 having a capacity suitable for each changed process can be used. It is thus possible to minimize power consumption of the arithmetic processing device 100 and maintain coherency for each process being executed.

Figure 10:
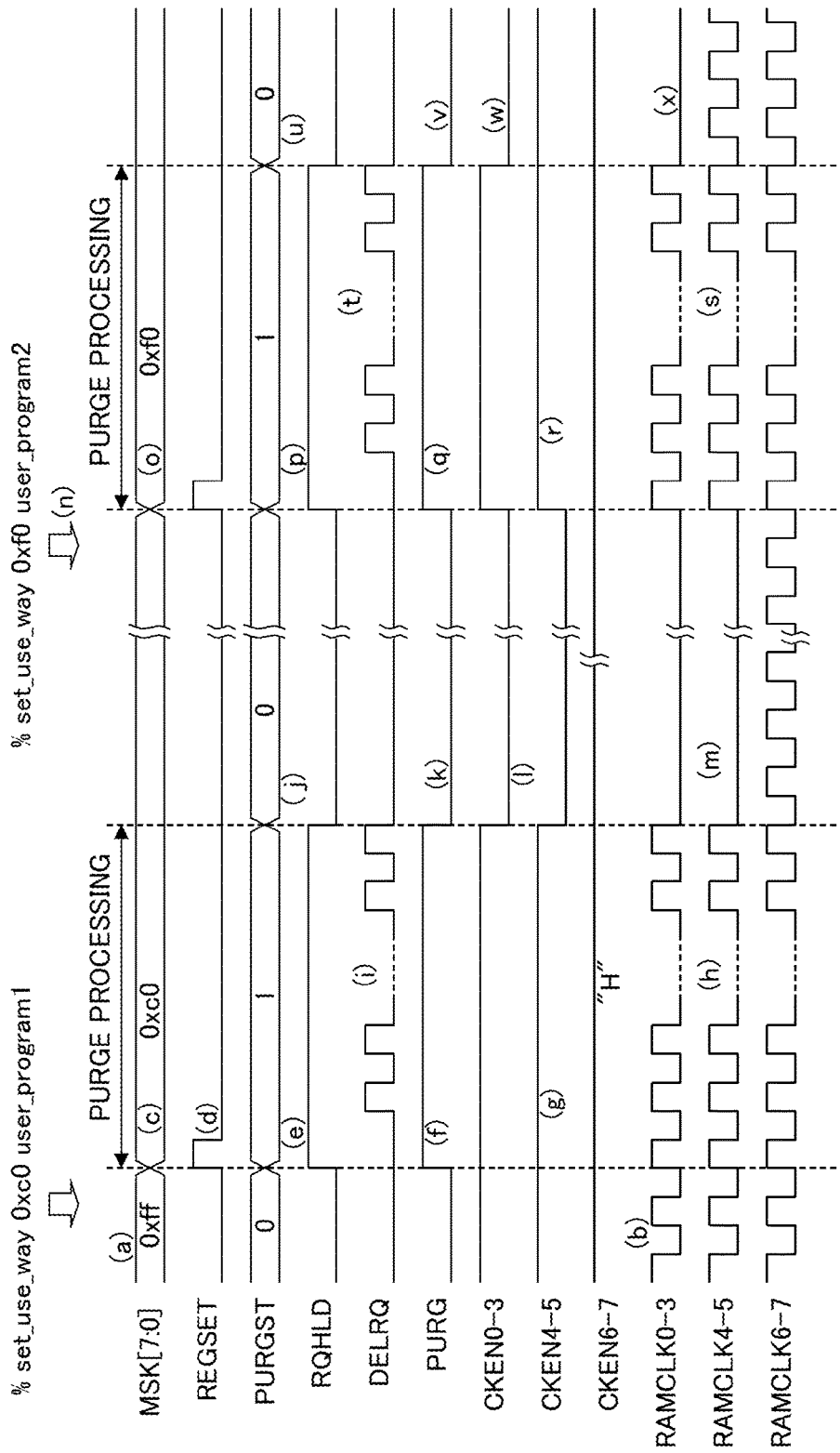
FIG. 10 is a diagram illustrating an example of operation of the arithmetic processing device illustrated in FIG. 2.

FIG. 10 illustrates an example of operation of the arithmetic processing device illustrated in FIG. 2. In an initial state of FIG. 10, the way mask register 18 retains mask bits MSK [7:0] of "0xff" ((a) in FIG. 10). The power control unit 22 generates all of the clocks RAMCLK0 to RAMCLK7 on the basis of the mask bits MSK constituted entirely of ones, so that all of the ways WAY0 to WAY7 of the cache memory 500 operate ((b) in FIG. 10). A purge state PURGST indicates an internal state of the purge control unit 20. A purge state PURGST of "0" indicates a non-operating state of the purge control unit 20. A purge state PURGST of "1" indicates an operating state of the purge control unit 20 (the purge processing is being performed).

The set_use_way command is input to the information processing device. As described with reference to FIG. 7, the value of the mask bits MSK [7:0] retained by the way mask register 18 is changed to "0xc0" ((c) in FIG. 10). The way mask register 18 outputs a change signal REGSET on the basis of the change in the mask bits MSK ((d) in FIG. 10). On the basis of the change signal REGSET, the purge control unit 20 sets the purge state PURGST to "1," and sets the request suppression signal RQHLD and the purge signal PURG to a high level ((e) and (f) in FIG. 10).

On the basis of the purge signal PURG having the high level, the power control unit 22 sets all of the clock enable signals CKEN0 to CKEN7 to a high level H, and generates all of the clocks RAMCLK0 to RAMCLK7 ((g) and (h) in FIG. 10). That is, all of the ways WAY operate irrespective of the value of the mask bits MSK during a period that the purge processing is performed. This enables access to the tag areas TAG and the data areas DATA of the ways WAY to be stopped from being used, and enables the deletion of data and the writing back of the data to the main storage device 400. Incidentally, in FIG. 10, the clocks RAMCLK0 to RAMCLK7 are output in the initial state, and therefore the levels of the clock enable signals CKEN0 to CKEN7 do not change from the initial state during the period of the purge processing.

On the basis of the request suppression signal RQHLD having the high level, the arbitrating unit 14 stops the output of a memory access request MARQ received from the request buffer 12 to the access control unit 16. The purge control unit 20 sequentially outputs deletion requests DELRQ in order to delete data retained in the ways WAY0 to WAY5 to be stopped from being used so as to correspond to the mask bits MSK0 to MSK5 of "0" ((i) in FIG. 10). In the present example, the purge control unit 20 generates 1536 deletion requests DELRQ in order to delete data retained in 256 entries in the data areas DATA of the six ways WAY0 to WAY5. Each deletion request DELRQ includes information indicating an index address IDXAD and the number of a way WAY.

Receiving a deletion request DELRQ, the arbitrating unit 14 outputs the deletion request DELRQ to the access control unit 16. The access control unit 16 reads data and control information from a data area DATA and a tag area TAG specified by the deletion request DELRQ. The access control unit 16 writes control information indicating that the data is invalid to the tag area TAG from which the control information is read. In addition, when the control information read from the tag area TAG indicates that the data retained in the data area DATA has been rewritten, the access control unit 16 performs processing of writing back the data read from the data area DATA to the main storage device 400. That is, the access control unit 16 performs the purge processing that deletes data retained in the ways WAY not to be used and which writes back the data to the main storage device 400.

After outputting the given number of deletion requests DELRQ, the purge control unit 20 sets the purge state PURGST to "0," and sets the request suppression signal RQHLD and the purge signal PURG to a low level ((j) and (k) in FIG. 10). On the basis of the changing of the purge signal PURG to the low level, the power control unit 22 fixes the clock enable signals CKEN0 to CKEN5 corresponding to the mask bits MSK0 to MSK5 of "0" to a low level ((l) in FIG. 10). The power control unit 22 thereby stops generating the clocks RAMCLK0 to RAMCLK5 ((m) in FIG. 10). Because the clocks RAMCLK0 to RAMCLK5 are stopped, the ways WAY0 to WAY5 stop operating, and go into a standby state. The power consumption of the cache memory 500 is therefore reduced as compared with a case where the clocks RAMCLK0 to RAMCLK5 are supplied to the ways WAY0 to WAY5.

The arithmetic processing device 100 thereafter executes an application program user_program1 specified by the set_use_way command using the two ways WAY6 and WAY7 of the cache memory 500. Incidentally, it is known by an evaluation performed in advance that the application program user_program1 can be executed without a decrease in performance by using the two ways WAY6 and WAY7. In other words, even when the application program user_program1 is executed by using the eight ways WAY0 to WAY7, the performance is not improved as compared with the case where the two ways WAY6 and WAY7 are used. When the application program user_program1 is executed using a minimum number of ways WAY that do not decrease the performance, power consumed by the cache memory 500 can be reduced as compared with the case where the eight ways WAY0 to WAY7 are used.

After the execution of the application program user_program1 is ended, a set_use_way command is input to the information processing device to execute a next application program user_program2 ((n) in FIG. 10). Detailed description will be omitted of processing identical or similar to the processing performed on the basis of the input of the set_use_way command for the application program user_program1.

The value of the mask bits MSK [7:0] retained by the way mask register 18 is changed to "0xf0" ((o) in FIG. 10). "0xf0" of the mask bits MSK [7:0] indicates that the ways WAY0 to WAY3 are stopped from being used and that the ways WAY4 to WAY7 are used.

On the basis of a change signal REGSET output by the way mask register 18, the purge control unit 20 sets the purge state PURGST to "1," and sets the request suppression signal RQHLD and the purge signal PURG to a high level ((p) and (q) in FIG. 10). On the basis of the purge signal PURG having the high level, the power control unit 22 sets all of the clock enable signals CKEN0 to CKEN7 to a high level H, and generates all of the clocks RAMCLK0 to RAMCLK7 ((r) and (s) in FIG. 10).

The purge control unit 20 sequentially outputs 1024 deletion requests DELRQ to expel data retained in the ways WAY0 to WAY3 to be stopped from being used so as to correspond to the mask bits MSK0 to MSK3 of "0" ((t) in FIG. 10). The arbitrating unit 14 outputs a deletion request DELRQ received from the purge control unit 20 to the access control unit 16. A data area DATA specified by the deletion request DELRQ is invalidated by the previous purge processing. A tag area TAG corresponding to the data area DATA retains information indicating that the data is invalid. Therefore, though the access control unit 16 accesses the data area DATA and the tag area TAG, the access control unit 16 neither rewrites the information retained in the tag area TAG, nor performs processing of expelling data.

After outputting the given number of deletion requests DELRQ, the purge control unit 20 sets the purge state PURGST to "0," and sets the request suppression signal RQHLD and the purge signal PURG to a low level ((u) and (v) in FIG. 10). On the basis of the changing of the purge signal PURG to the low level, the power control unit 22 fixes the clock enable signals CKEN0 to CKEN3 corresponding to the mask bits MSK0 to MSK3 of "0" to a low level ((w) in FIG. 10). The power control unit 22 thereby stops generating the clocks RAMCLK0 to RAMCLK3 ((x) in FIG. 10).

The arithmetic processing device 100 thereafter executes the application program user_program2 specified by the set_use_way command using the four ways WAY4 to WAY7 of the cache memory 500. Incidentally, it is known by an evaluation performed in advance that the application program user_program2 can be executed without a decrease in performance by using the four ways WAY4 to WAY7. Hence, as in the execution of the program user_program1, the power consumed by the cache memory 500 can be reduced as compared with the case where the eight ways WAY0 to WAY7 are used.

Figure 11:
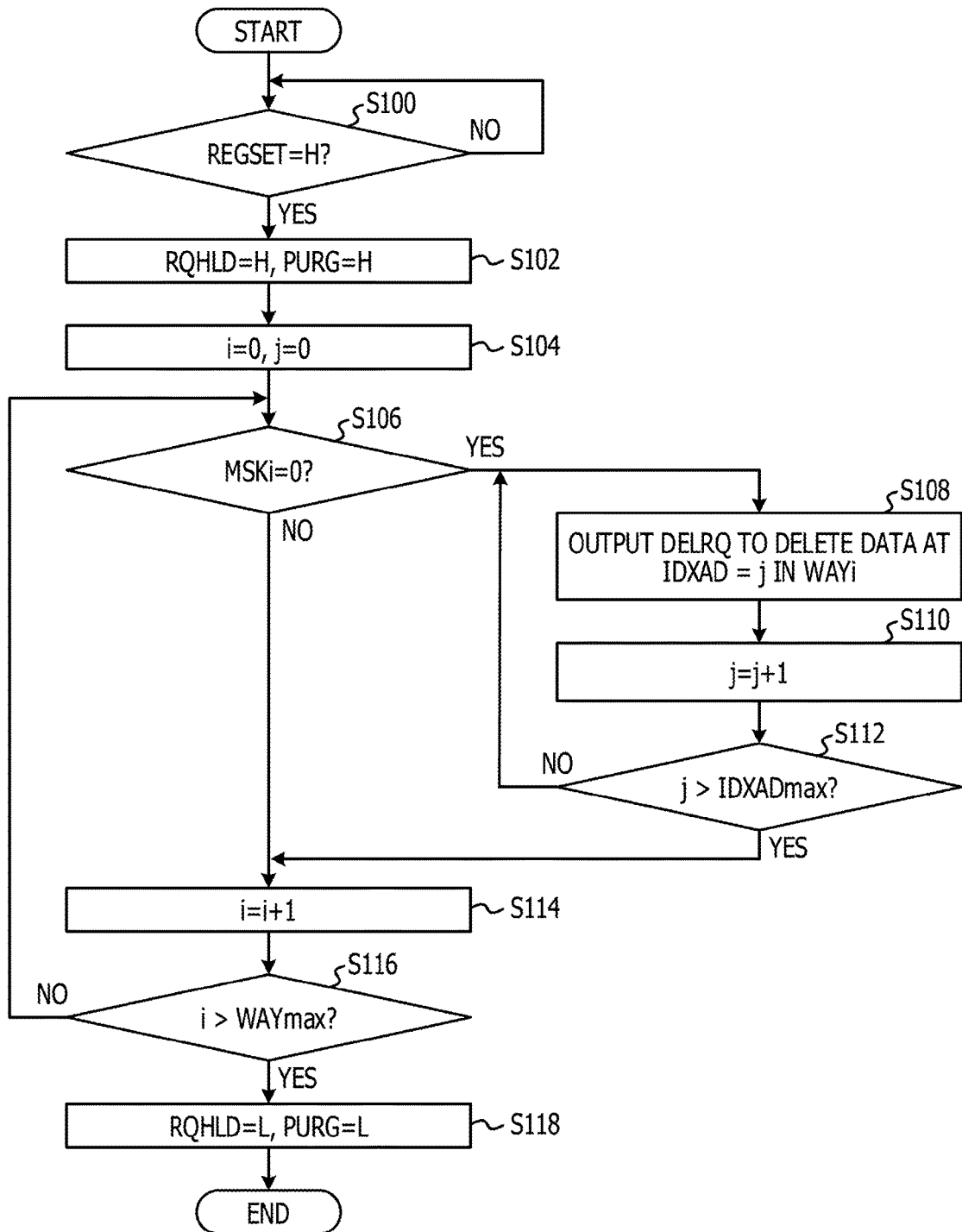
FIG. 11 is a diagram illustrating an example of operation of a purge control unit illustrated in FIG. 2.

FIG. 11 illustrates an example of operation of the purge control unit illustrated in FIG. 2. First, in step S100, the purge control unit 20 shifts the operation to step S102 when the change signal REGSET is set to a high level H. While the change signal REGSET is maintained at a low level, the purge control unit 20 repeats the determination of step S100.

In step S102, the purge control unit 20 sets the request suppression signal RQHLD and the purge signal PURG to a high level H. The purge control unit 20 then shifts the operation to step S104. In step S104, the purge control unit 20 sets counter values i and j to "0." The purge control unit 20 then shifts the operation to step S106. When the mask bit MSKi is "0" in step S106, the purge control unit 20 shifts the operation to step S108. When the mask bit MSKi is not "0" (that is, the mask bit MSKi is "1") in step S106, the purge control unit 20 shifts the operation to step S114.

In step S108, the purge control unit 20 outputs a deletion request DELRQ to delete data whose index address IDXAD is "j" in the way WAYi. In next step S110, the purge control unit 20 increments the counter value j by "1." The purge control unit 20 then shifts the operation to step S112. When the counter value j is larger than a maximum value IDMDmax of the index address IDXAD in step S112, the purge control unit 20 shifts the processing to step S114. When the counter value j is equal to or smaller than the maximum value IDXADmax, the purge control unit 20 returns the processing to step S108 to repeat the operation of outputting a deletion request DELRQ. The deletion of data retained in each entry within the way WAY to be stopped from operating is thus performed sequentially. Incidentally, when the cache memory 500 includes 256 entries identified by the index address IDXAD (IDXAD=0 to 255), the maximum value IDXADmax is "255."

In step S114, on the other hand, the purge control unit 20 increments the counter value i by "1." The purge control unit 20 then shifts the operation to step S116. When the counter value i is larger than a maximum value WAYmax (for example "7") of the numbers of the ways WAY in step S116, the purge control unit 20 shifts the processing to step S118. Further, when the counter value i is equal to or smaller than the maximum value WAYmax, the purge control unit 20 returns the processing to step S106 to perform the purge processing for the data of a next way WAY. In step S118, the purge control unit 20 sets the request suppression signal RQHLD and the purge signal PURG to a low level L. The purge control unit 20 then ends the operation of the purge processing.

FIG. 12 illustrates an example of operation of the replacement way selecting unit illustrated in FIG. 2. The replacement way selecting unit 24 starts to operate on the basis of determination of a cache miss by the access control unit 16.

First, in step S200, the replacement way selecting unit 24 receives an index address IDXAD at which a cache miss has occurred from the access control unit 16. Next, in step S202, the replacement way selecting unit 24 reads tag data TAGDT from tag areas TAG0 to TAG7 indicated by the index address IDXAD. Next, in step S204, the replacement way selecting unit 24 determines, as a replacement object, data not referred to for a longest time among pieces of data retained in the data areas DATA of ways WAY corresponding to mask bits MSK of "1" by using the LRU method. The replacement way selecting unit 24 notifies the number of the way WAY retaining the data set as the replacement object to the access control unit 16. The replacement way selecting unit 24 then ends the operation of selecting the way WAY in which to replace the data.

The above-described embodiment illustrated in FIGS. 2 to 12 can provide effects similar to the effects of the embodiment illustrated in FIG. 1. That is, when the power consumption of the arithmetic processing device 100 is reduced by stopping the operation of ways WAY not used, coherency between the cache memory 500 and the main storage device 400 can be maintained. In addition, the arithmetic processing device 100 retains the default value of the mask bits MSK7 to MSK0 as the context of a process when the argument of a system call does not include information for rewriting the mask bits MSK7 to MSK0 of the way mask register 18. Thus, retention of an improper setting as a context can be suppressed. A decrease in processing efficiency of the generated process can therefore be suppressed.

Further, in the embodiment illustrated in FIGS. 2 to 12, even when there are ways WAY not used according to the mask bits MSK, the replacement way selecting unit 24 can determine a way WAY in which to replace data on the basis of the LRU method. Thus, the ways WAY stopped from being used can be suppressed from being set as a data replacement object. An erroneous operation of the arithmetic processing device 100 can therefore be suppressed.

By making all of the ways WAY operate irrespective of the value of the mask bits MSK, it is possible to access the tag areas TAG and the data areas DATA of the ways WAY to be stopped from being used, and possible to perform the deletion of data and the writing back of the data to the main storage device 400. The operation of ways WAY is stopped by stopping the clocks RAMCLK supplied to the ways WAY not to be used. It is thereby possible to reduce the power consumption of the cache memory 500 by a simple mechanism as compared with cases where the operation of the ways WAY is stopped by other methods.

In addition, the ways WAY to be used can be changed without an instruction to rewrite the mask bits MSK7 to MSK0 of the way mask register 18 being embedded in the application program. In other words, the ways WAY to be used can be changed without the application program being changed.

Figure 13:
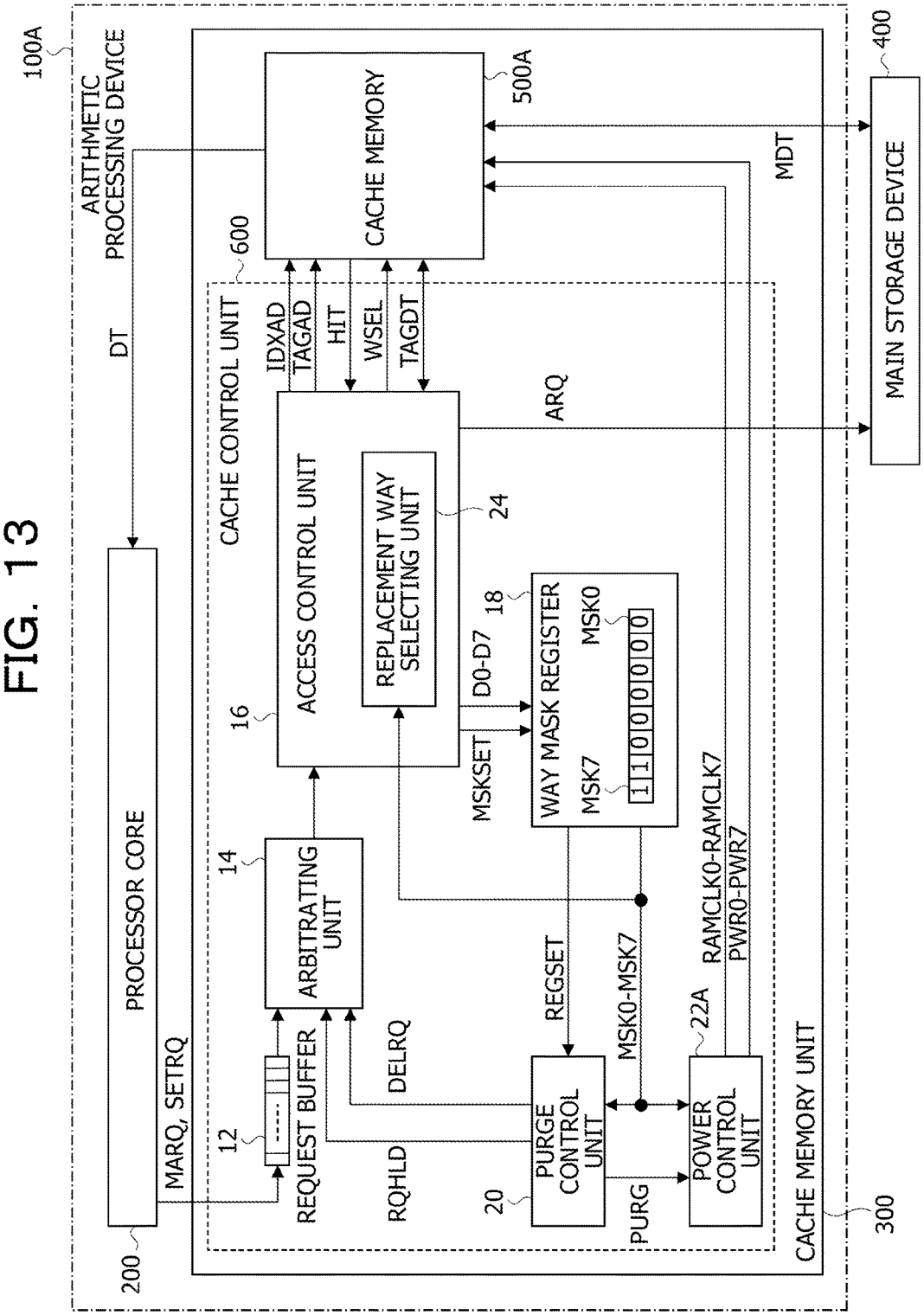
FIG. 13 is a diagram illustrating another embodiment of an arithmetic processing device, a control method of the arithmetic processing device, and a control program of the arithmetic processing device.

FIG. 13 illustrates another embodiment of an arithmetic processing device, a control method of the arithmetic processing device, and a control program of the arithmetic processing device. Elements identical or similar to the elements described in the embodiment illustrated in FIG. 2 are identified by the same reference numerals, and detailed description thereof will be omitted. An arithmetic processing device 100A illustrated in FIG. 13 includes a cache memory 500A and a power control unit 22A in place of the cache memory 500 and the power control unit 22 illustrated in FIG. 2. The other configuration of the arithmetic processing device 100A is similar to the configuration of the arithmetic processing device 100 illustrated in FIG. 2.

The power control unit 22A has a function of outputting clocks RAMCLK (RAMCLK0 to RAMCLK7) and power supply control signals PWR (PWR0 to PWR7) on the basis of the value of mask bits MSK0 to MSK7 and a purge signal PURG. An example of the power control unit 22A is illustrated in FIG. 15.

Figure 14:
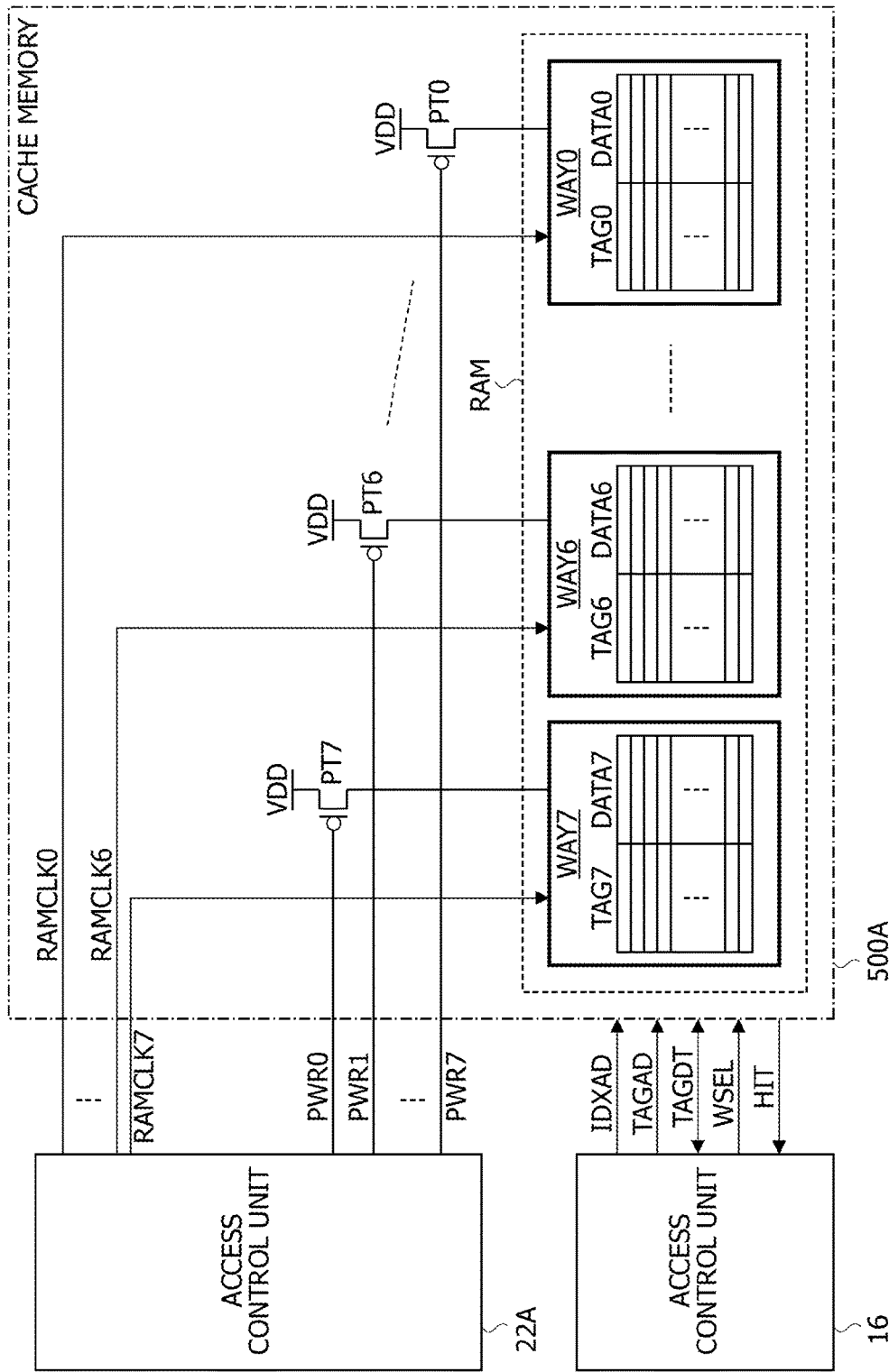
FIG. 14 is a diagram illustrating an example of principal parts of a cache memory illustrated in FIG. 13.

FIG. 14 illustrates an example of principal parts of the cache memory illustrated in FIG. 13. The cache memory 500A is formed by adding power switches PT (PT0 to PT7) coupled to ways WAY (WAY0 to WAY7) to the cache memory 500 illustrated in FIG. 3 and FIG. 4. The other configuration of the cache memory 500A is similar to the configuration of the cache memory 500 illustrated in FIG. 3 and FIG. 4 except that power supply control signals PWR (PWR0 to PWR7) are supplied to the power switches PT. Incidentally, the ways WAY0 to WAY7 are electrically separated from each other. A power supply voltage VDD supplied to the way WAY0, for example, is used only within the way WAY0.

Each power switch PT includes a p-channel metal oxide semiconductor (MOS) transistor disposed between a power supply voltage VDD and the power supply terminal of a respective way WAY. The p-channel MOS transistor supplies the power supply voltage VDD to the way WAY while the gate of the p-channel MOS transistor receives the power supply control signal PWR having a low level. The p-channel MOS transistor stops supplying the power supply voltage VDD to the way WAY while the gate of the p-channel MOS transistor receives the power supply control signal PWR having a high level. That is, the cache memory 500A adopts a power gating method that dynamically stops the power supply voltage VDD. Stopping the supply of the power supply voltage VDD to the way WAY can suppress a leakage current flowing between the power supply voltage VDD of the way WAY and a grounding line. Thus, power consumption can be further reduced as compared with the case where the clocks RAMCLK are stopped.

Figure 15:
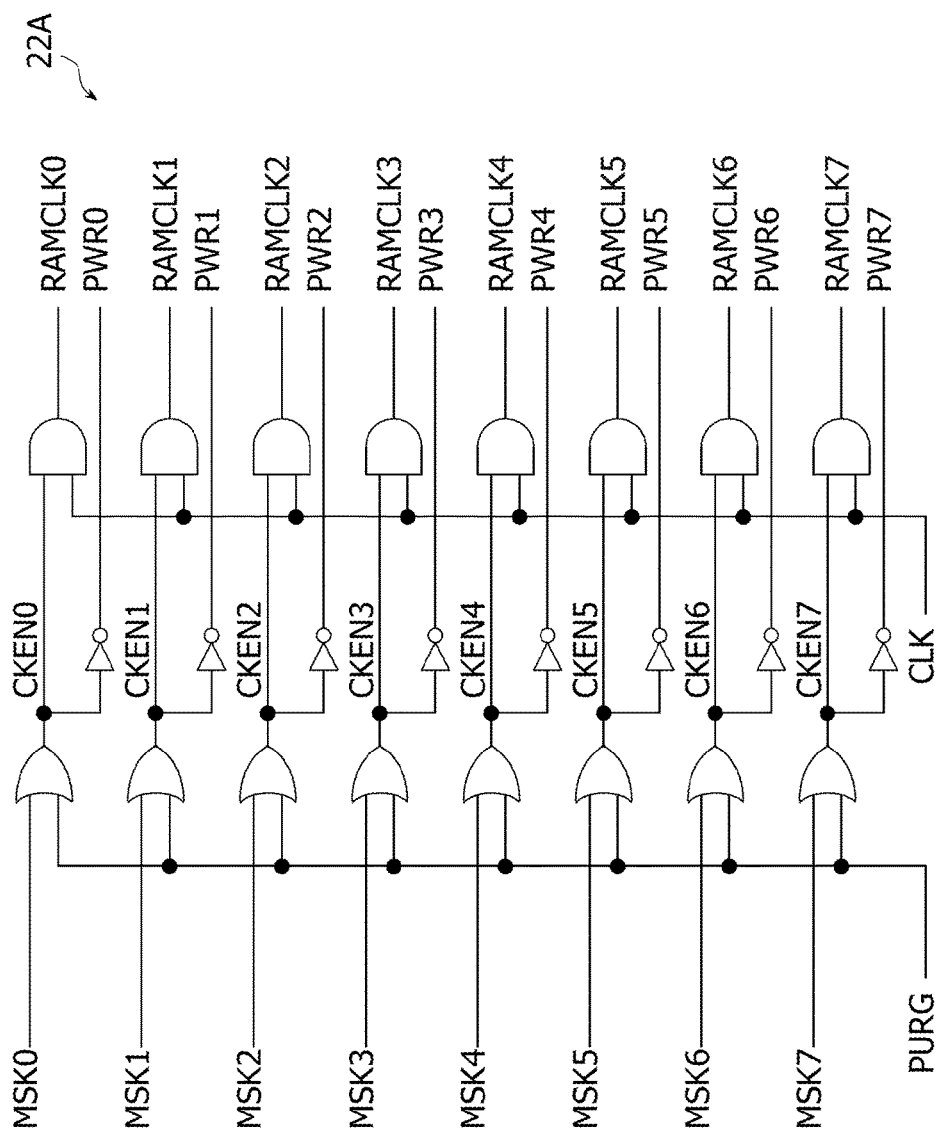
FIG. 15 is a diagram illustrating an example of a power control unit illustrated in FIG. 14.

FIG. 15 illustrates an example of the power control unit illustrated in FIG. 14. Elements identical or similar to the elements of the power control unit 22 illustrated in FIG. 6 will not be described in detail. The power control unit 22A is formed by adding logics for generating the power supply control signals PWR (PWR0 to PWR7) to the power control unit 22 illustrated in FIG. 6. Each power supply control signal PWR (PWR0 to PWR7) is generated by inverting the logic of the clock enable signal CKEN (CKEN0 to CKEN7), for example. In this case, a period during which the output of the clock RAMCLK is stopped and a period during which the power supply control signal PWR is set to a high level to stop the supply of the power supply voltage VDD to the way WAY overlap each other.

Incidentally, the power control unit 22A may output only the power supply control signals PWR (PWR0 to PWR7) without outputting the clocks RAMCLK (RAMCLK0 to RAMCLK7). Also in this case, power consumption can be reduced as in the case where the clocks RAMCLK are stopped.

Figure 16:
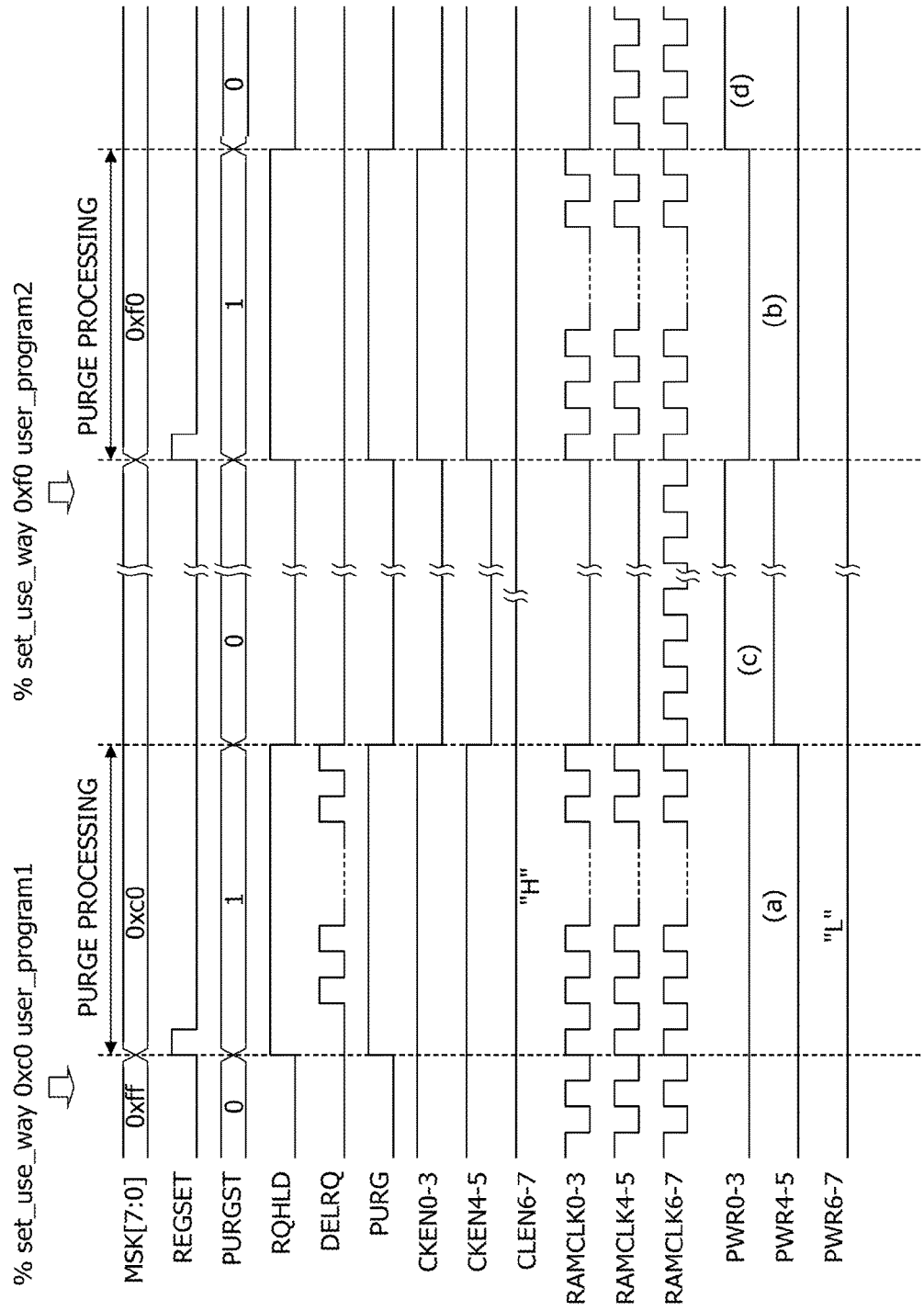
FIG. 16 is a diagram illustrating an example of operation of the arithmetic processing device illustrated in FIG. 13.

FIG. 16 illustrates an example of operation of the arithmetic processing device illustrated in FIG. 13. Operations identical or similar to the operations of FIG. 10 will not be described in detail. The operations illustrated in FIG. 16 are the same as in FIG. 10 except that the operations illustrated in FIG. 16 are represented by adding the waveforms of the power supply control signals PWR (PWR0 to PWR7) to FIG. 10.

While purge processing is performed, the power supply control signals PWR (PWR0 to PWR7) are set at a low level L, so that the power supply voltage VDD is supplied to all of the ways WAY0 to WAY7 ((a) and (b) in FIG. 16). After completion of the purge processing, on the other hand, power supply control signals PWR (PWR0 to PWR5 or PWR0 to PWR3) corresponding to ways WAY to be stopped from being used are set at a high level, so that the supply of the power supply voltage VDD to the ways WAY to be stopped from being used is stopped ((c) and (d) in FIG. 16).

The above-described embodiment illustrated in FIGS. 13 to 16 can also provide effects similar to the effects of the embodiments illustrated in FIGS. 1 to 12. That is, when the power consumption of the arithmetic processing device 100A is reduced by stopping the operation of ways WAY not used, coherency between the cache memory 500A and a main storage device 400 can be maintained. In addition, a replacement way selecting unit 24 can suppress a way WAY stopped from being used from being set as a data replacement object. An erroneous operation of the arithmetic processing device 100A can therefore be suppressed. During the purge period, irrespective of the value of mask bits MSK, all of the ways WAY can be made to operate, thus enabling the deletion of data and the writing back of the data to the main storage device 400. Ways WAY to be used can be changed without the application program being changed. In addition, when the argument of a system call does not include information for rewriting the mask bits MSK7 to MSK0 of a way mask register 18, the arithmetic processing device 100A retains the default value of the mask bits MSK7 to MSK0 as the context of a process. Thus, retention of an improper setting as a context can be suppressed. A decrease in processing efficiency of the generated process can therefore be suppressed.

Further, by stopping the supply of the power supply voltage VDD to ways WAY stopped from being used, the embodiment illustrated in FIGS. 13 to 16 can further reduce the power consumption of the arithmetic processing device 100A as compared with the embodiment illustrated in FIGS. 2 to 12.

Figure 17:
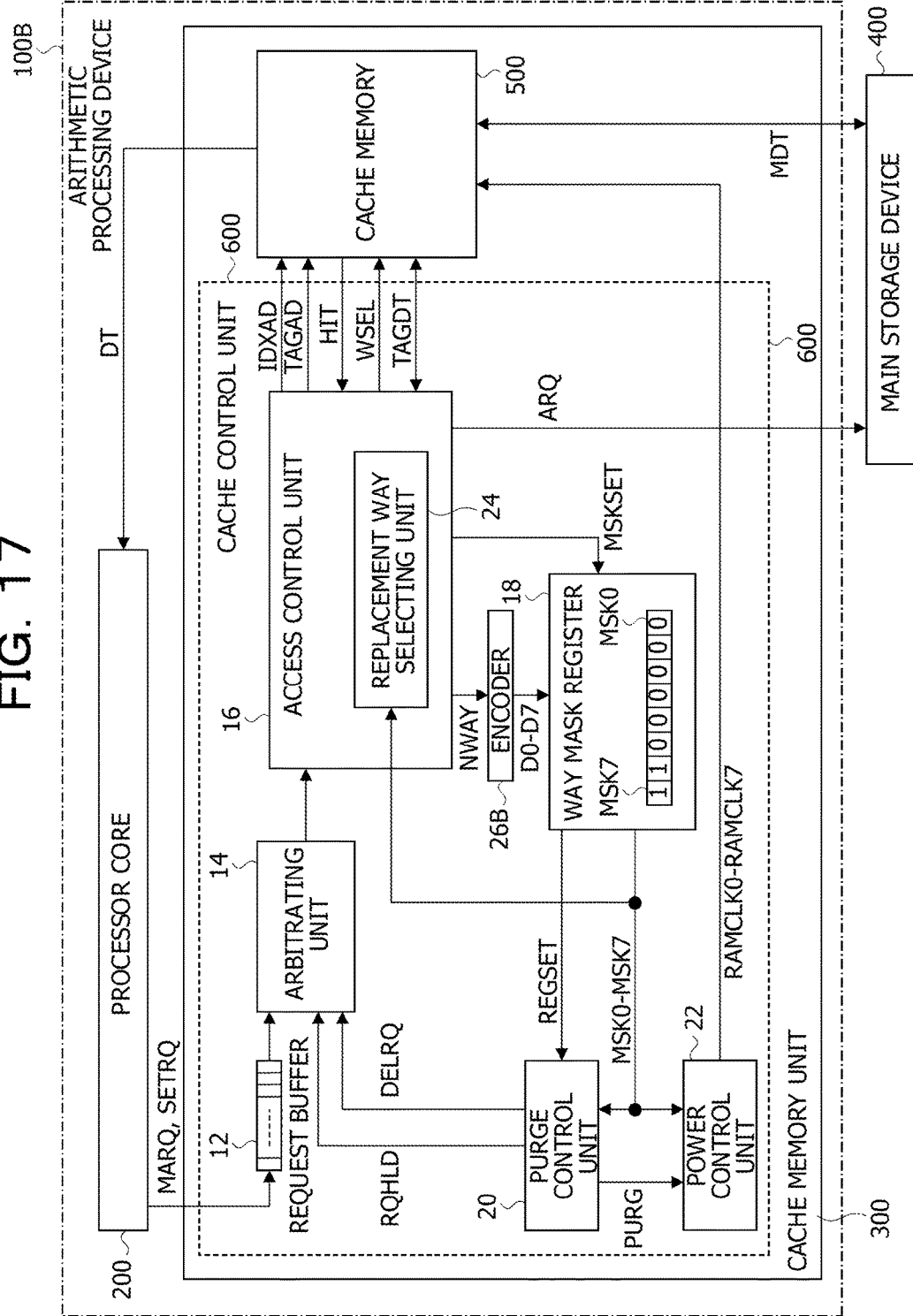
FIG. 17 is a diagram illustrating another embodiment of an arithmetic processing device, a control method of the arithmetic processing device, and a control program of the arithmetic processing device.

FIG. 17 illustrates another embodiment of an arithmetic processing device, a control method of the arithmetic processing device, and a control program of the arithmetic processing device. Elements identical or similar to the elements described in the embodiment illustrated in FIG. 2 are identified by the same reference numerals, and detailed description thereof will be omitted. An arithmetic processing device 100B illustrated in FIG. 17 is formed by adding an encoder 26B to the arithmetic processing device 100 illustrated in FIG. 2. The other configuration of the arithmetic processing device 100B is similar to the configuration of the arithmetic processing device 100 illustrated in FIG. 2.

An access control unit 16 outputs a mask set signal MSKSET to rewrite information of a way mask register 18 together with data NWAY (information indicating the number of ways WAY to be used) included in a set request SETRQ from a processor core 200. That is, in the present embodiment, the first argument of the set_use_way command illustrated in FIG. 10 specifies the data NWAY ("2," "4," or the like) in place of the value of the mask bits MSK7 to MSK0 ("0xc0," "0xf0," or the like). The data NWAY is an example of way number information indicating the number of ways WAY to be used.

The encoder 26B receives the data NWAY indicating the number of ways WAY to be used from the processor core 200 via a request buffer 12, an arbitrating unit 14, and an access control unit 16. In addition, the encoder 26B generates data D7 to D0 corresponding to the value of the mask bits MSK7 to MSK0 on the basis of the received data NWAY, and outputs the generated data D7 to D0 to the way mask register 18. The data D7 to D0 is stored in the way mask register 18 as the mask bits MSK7 to MSK0 in synchronism with the mask set signal MSKSET.

When the first argument of the set_use_way command is "2," for example, the encoder 26B outputs data D7 to D0 representing a bit value "11000000" to the way mask register 18. When the first argument of the set_use_way command is "4," the encoder 26B outputs data D7 to D0 representing a bit value "11110000" to the way mask register 18. Bit positions set at a high level according to the value of the first argument (that is, the positions of ways WAY to be used) are not limited to the above-described example, but may be a bit value "00110000," or may be a bit value "00111100."

Incidentally, the encoder 26B may be provided within the way mask register 18. In this case, the way mask register 18 may generate a change signal REGSET and the mask bits MSK0 to MSK7 on the basis of the data NWAY representing the number of ways WAY. The encoder 26B is an example of a usage information generating unit that generates the data D0 to D7 corresponding to MSK0 to MSK7 on the basis of the data NWAY received from the processor core 200 and which stores the generated data D0 to D7 in the way mask register 18.

The above-described embodiment illustrated in FIG. 17 can provide effects similar to the effects of the embodiment illustrated in FIGS. 1 to 12 as described in the embodiment illustrated in FIGS. 13 to 16. Further, also in the case where the data NWAY representing the number of ways WAY to be used is received, the embodiment illustrated in FIG. 17 can set the mask bits MSK0 to MSK7 in the way mask register 18 by the encoder 26B. Incidentally, the encoder 26B illustrated in FIG. 17 may be added to the arithmetic processing device 100A illustrated in FIG. 13 and an arithmetic processing device illustrated in FIG. 18.

Figure 18:
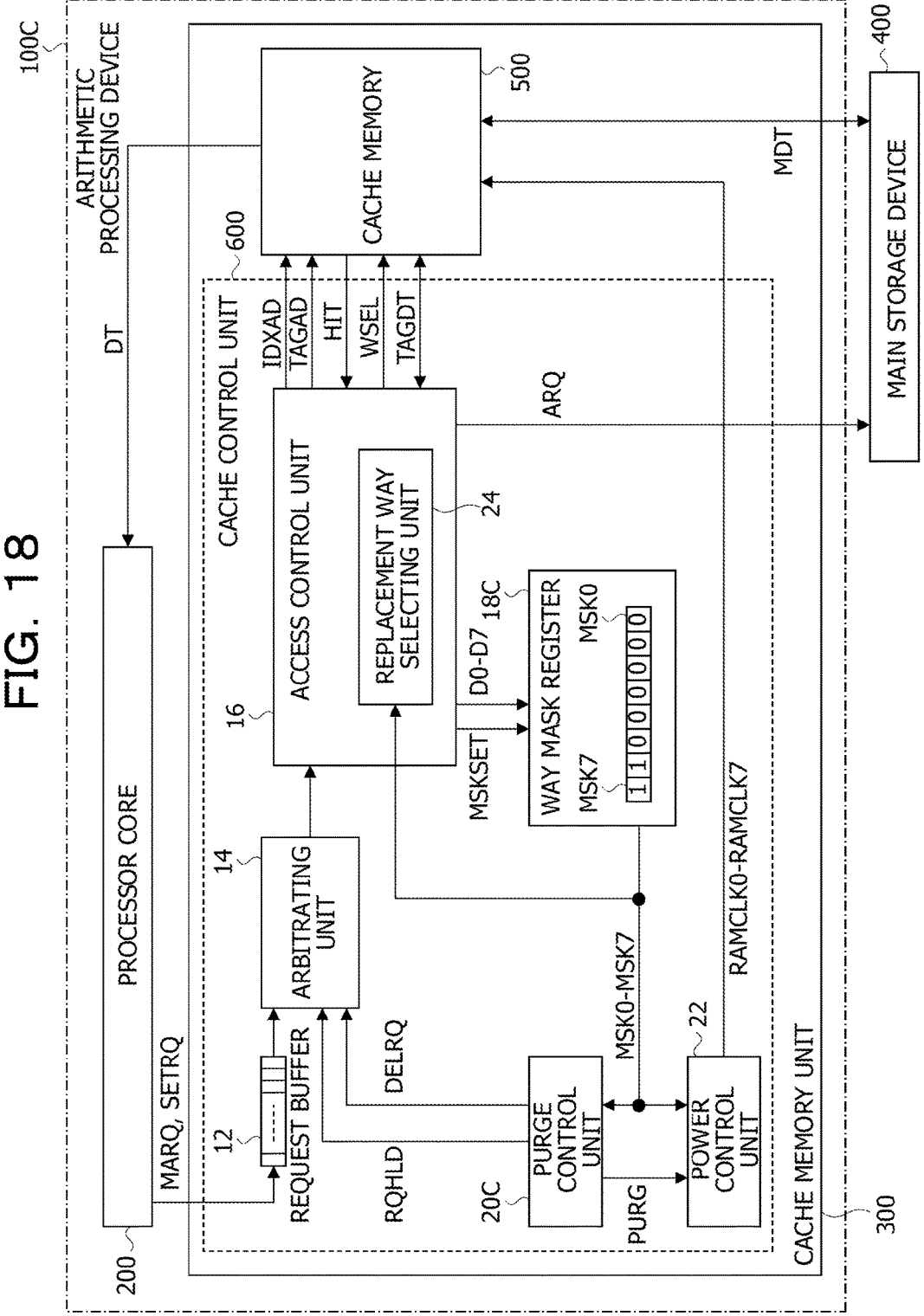
FIG. 18 is a diagram illustrating another embodiment of an arithmetic processing device, a control method of the arithmetic processing device, and a control program of the arithmetic processing device.

FIG. 18 illustrates another embodiment of an arithmetic processing device, a control method of the arithmetic processing device, and a control program of the arithmetic processing device. Elements identical or similar to the elements described in the embodiment illustrated in FIG. 2 are identified by the same reference numerals, and detailed description thereof will be omitted. An arithmetic processing device 100C illustrated in FIG. 18 includes a way mask register 18C and a purge control unit 20C in place of the way mask register 18 and the purge control unit 20 illustrated in FIG. 2. The other configuration of the arithmetic processing device 100C is similar to the configuration of the arithmetic processing device 100 illustrated in FIG. 2.

The way mask register 18C is formed by omitting the function of outputting the change signal REGSET when the logical value of at least one of the mask bits MSK0 to MSK7 is inverted from the way mask register 18 illustrated in FIG. 2. The inversion of the logical value of at least one of the mask bits MSK0 to MSK7 is detected by the purge control unit 20C.

The purge control unit 20C has a function of detecting the mask bits MSK0 to MSK7 whose logic is changed from "1" to "0" and a function of detecting the mask bits MSK0 to MSK7 whose logic is changed from "0" to "1." The purge control unit 20C also has a function of outputting a request suppression signal RQHLD, a deletion request DELRQ, and a purge signal PURG on the basis of a change in logic of at least one of the mask bits MSK0 to MSK7. An example of the purge control unit 20C is illustrated in FIG. 19.

Figure 19:
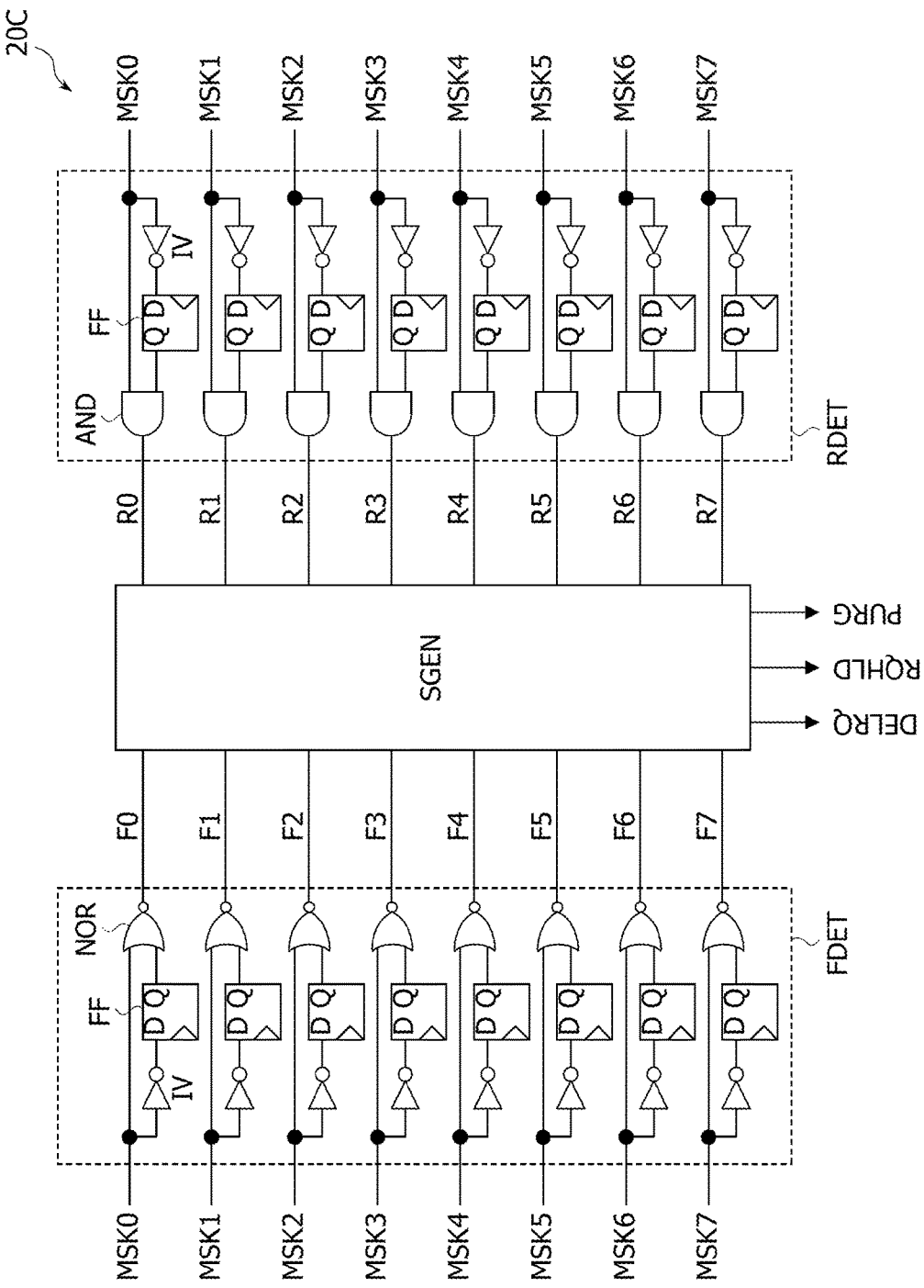
FIG. 19 is a diagram illustrating an example of a purge control unit illustrated in FIG. 18.

FIG. 19 illustrates an example of the purge control unit illustrated in FIG. 18. The purge control unit 20C includes a detecting unit FDET that detects the mask bits MSK0 to MSK7 whose logic is changed from "1" to "0" and a detecting unit RDET that detects the mask bits MSK0 to MSK7 whose logic is changed from "0" to "1." The purge control unit 20C also includes a signal generating unit SGEN that generates the request suppression signal RQHLD, the deletion request DELRQ, and the purge signal PURG on the basis of a result of detection by the detecting units FDET and RDET.

The detecting unit FDET includes an inverter IV, a flip-flop FF, and a NOR gate NOR in correspondence with each of the mask bit signals MSK0 to MSK7. Each NOR gate NOR receives the respective mask bit signals MSK0 to MSK7 and a signal obtained by delaying the inverted logic of the respective mask bit signals MSK0 to MSK7 by one clock cycle in the flip-flop FF. Then, each NOR gate NOR outputs a detection pulse signal F (F0 to F7) having a high level in a period in which the logics of the two received signals are each a low level. That is, the NOR gates NOR receive the values of the respective mask bits MSK and the values obtained by inverting the values of the respective mask bits MSK, and generate the detection pulse signals F (F0 to F7) having a high level on the basis of changes in the logics of the mask bits MSK from "1" to "0."

The detecting unit RDET includes an inverter IV, a flip-flop FF, and an AND gate AND in correspondence with each of the mask bit signals MSK0 to MSK7. Each AND gate AND receives the respective mask bit signals MSK0 to MSK7 and a signal obtained by delaying the inverted logic of the respective mask bit signals MSK0 to MSK7 by one clock cycle in the flip-flop FF. Then, each AND gate AND outputs a detection pulse signal R (R0 to R7) having a high level in a period in which the logics of the two received signals are each a high level. That is, the AND gates AND receive the values of the respective mask bits MSK and the values obtained by inverting the values of the respective mask bits MSK, and generate the detection pulse signals R (R0 to R7) having a high level on the basis of changes in the logics of the mask bits MSK from "0" to "1." Incidentally, the changes in the logics of the mask bits MSK from "0" to "1" may be detected by using exclusive OR circuits that receive signals indicating the values of the respective mask bits MSK and signals obtained by delaying the values of the respective mask bits MSK.

When the signal generating unit SGEN receives at least one of the detection pulse signals F0 to F7 or at least one of the detection pulse signals R0 to R7, the signal generating unit SGEN sets the request suppression signal RQHLD and the deletion request DELRQ to a high level. In addition, the signal generating unit SGEN outputs a given number of deletion requests DELRQ on the basis of the reception of each detection pulse signal F, and returns the request suppression signal RQHLD and the deletion request DELRQ to a low level after the output of the deletion requests DELRQ. The number of deletion requests DELRQ output on the basis of the reception of each detection pulse signal F is equal to the number of entries of the data areas DATA of each way WAY (for example 256). In addition, when the signal generating unit SGEN receives at least one of the detection pulse signals R0 to R7 without receiving the detection pulse signals F0 to F7, the signal generating unit SGEN immediately returns the request suppression signal RQHLD and the deletion request DELRQ set at the high level to the low level.

It suffices for the purge processing, which deletes data retained in the data areas DATA of ways WAY, to be performed in a way WAY to be stopped from being used. The purge processing can be omitted in a way WAY that starts to be used and a way WAY being used. This is because the data areas DATA of a way WAY stopped from being used do not retain data, and the tag areas TAG corresponding to the respective data areas DATA retain tag data TAGDT indicating that the data areas DATA are invalid. The purge control unit 20C therefore performs the purge processing in only ways WAY to be stopped from being used.

Figure 20:
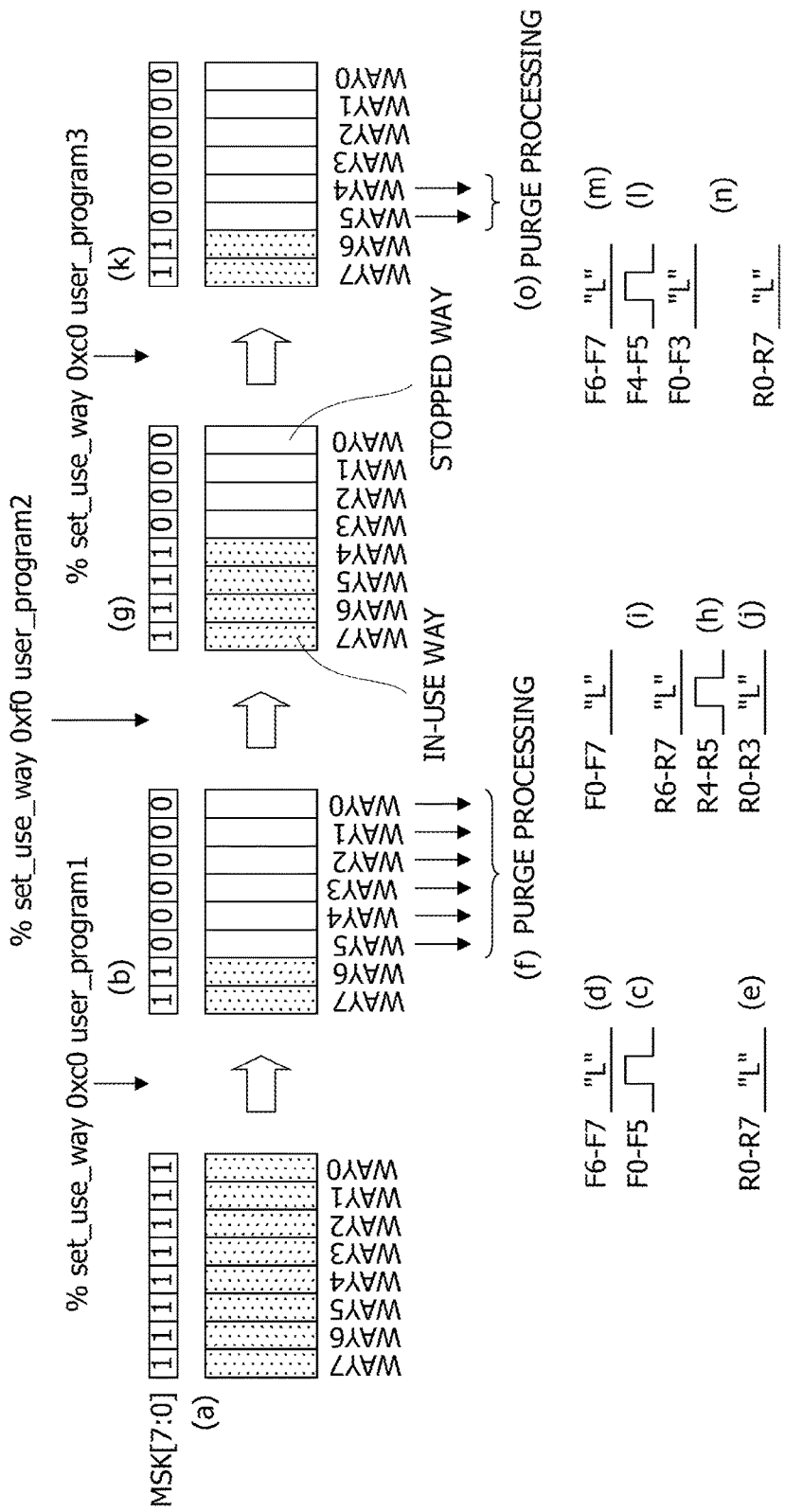
FIG. 20 is a diagram illustrating an example of purge processing performed by the purge control unit illustrated in FIG. 19.

FIG. 20 illustrates an example of purge processing performed by the purge control unit illustrated in FIG. 19. In FIG. 20, shaded ways WAY represent in-use ways being used, and outlined ways WAY represent stopped ways stopped from being used. In an initial state, the mask bits MSK [7:0] of the way mask register 18C each retain "1," and therefore the ways WAY0 to WAY7 are set as in-use ways ((a) in FIG. 20).

On the basis of the input of a set_use_way command "set_use_way 0xc0 user_program1," the mask bits MSK [7:0] of the way mask register 18C are changed to "11000000" ((b) in FIG. 20). On the basis of the change in the mask bits MSK [5:0] from a logical one to a logical zero, the detecting unit FDET of the purge control unit 20C generates detection pulse signals F0 to F5 having a high level ((c) in FIG. 20). The detection pulse signals F6 and F7 and the detection pulse signals R0 to R7 are maintained at a low level L ((d) and (e) in FIG. 20). The signal generating unit SGEN of the purge control unit 20C sequentially outputs deletion requests DELRQ for the ways WAY0 to WAY5 on the basis of the detection pulse signals F0 to F5 to make the access control unit 16 perform the purge processing of the ways WAY0 to WAY5 ((f) in FIG. 20). The ways WAY0 to WAY5 are then set as stopped ways.

Next, on the basis of the input of a set_use_way command "set_use_way 0xf0 user_program2," the mask bits MSK [7:0] of the way mask register 18C are changed to "11110000" ((g) in FIG. 20). On the basis of the change in the mask bits MSK [5:4] from a logical zero to a logical one, the detecting unit RDET of the purge control unit 20C generates detection pulse signals R4 and R5 having a high level ((h) in FIG. 20). The detection pulse signals F0 to F7 and the detection pulse signals R6, R7, and R0 to R3 are maintained at the low level L ((i) and (j) in FIG. 20).

When the mask bits MSK are changed from a logical zero to a logical one, the ways WAY in which the data areas DATA are invalid are only changed from stopped ways to in-use ways, and thus the purge processing can be omitted. Therefore, when mask bits MSK are changed from a logical zero to a logical one without any mask bits MSK being changed from a logical one to a logical zero, the signal generating unit SGEN of the purge control unit 20C does not generate deletion requests DELRQ. The performance of the purge processing is thereby omitted. Incidentally, as illustrated in FIG. 21, even when the purge processing is not performed, the signal generating unit SGEN temporarily sets the request suppression signal RQHLD and the purge signal PURG to a high level on the basis of the detection pulse signals R4 and R5. The ways WAY4 and WAY5 are then set as in-use ways.

Next, on the basis of the input of a set_use_way command "set_use_way 0xc0 user_program3," the mask bits MSK [7:0] of the way mask register 18C are changed to "11000000" ((k) in FIG. 20). On the basis of the change in the mask bits MSK [5:4] from a logical one to a logical zero, the detecting unit FDET of the purge control unit 20C generates detection pulse signals F4 and F5 having a high level ((l) in FIG. 20). The detection pulse signals F6, F7, and F0 to F3 and the detection pulse signals R0 to R7 are maintained at the low level L ((m) and (n) in FIG. 20).

The signal generating unit SGEN of the purge control unit 20C sequentially outputs deletion requests DELRQ for the ways WAY4 and WAY5 on the basis of the detection pulse signals F4 and F5 to make the access control unit 16 perform the purge processing of the ways WAY4 and WAY5 ((o) in FIG. 20). The ways WAY4 and WAY5 are then set as stopped ways.

On the other hand, the signal generating unit SGEN of the purge control unit 20C does not output deletion requests DELRQ for the ways WAY0 to WAY3 whose detection pulse signals F0 to F3 are not received. When the mask bits MSK are maintained at a logical zero, the ways WAY in which the data areas DATA are invalid are maintained as stopped ways, and thus the purge processing can be omitted. Therefore, even when one or more of the mask bits MSK [7:0] are changed from a logical one to a logical zero, the signal generating unit SGEN of the purge control unit 20C does not generate deletion requests DELRQ for the ways WAY whose mask bits MSK are maintained at a logical zero.

By suppressing the output of deletion requests DELRQ for the ways WAY for which the purge processing can be omitted, the purge control unit 20C can shorten a time taken to perform the purge processing as compared with a case where the output of the deletion requests DELRQ is not suppressed. It is thereby possible to suppress a decrease in processing efficiency of the arithmetic processing device 100C due to unnecessary purge processing.

FIG. 21 illustrates an example of operation of the arithmetic processing device illustrated in FIG. 18. Operations identical or similar to FIG. 10 will not be described in detail. In FIG. 21, the operations up to the input of the second set_use_way command "set_use_way 0xf0 user_program2" are similar to the operations of FIG. 10. Incidentally, FIG. 21 does not illustrate the waveforms of the clock enable signals CKEN0 to CKEN7 and the clocks RAMCLK0 to RAMCLK7 illustrated in FIG. 10, but includes the waveforms of the detection pulse signals F0 to F7 and R0 to R7.

When the signal generating unit SGEN receives one or more of the detection pulse signals F0 to F7, the signal generating unit SGEN sets the request suppression signal RQHLD and the purge signal PURG to a high level, and sequentially generates deletion requests DELRQ for one or more ways WAY to be stopped from being used ((a), (b), and (c) in FIG. 21).

On the other hand, as described with reference to FIG. 20, when there is no mask bit MSK changed from a logical one to a logical zero but one or more of the mask bits MSK are changed from a logical zero to a logical one, the purge processing can be omitted. Therefore, when one or more of the mask bits MSK are changed only from a logical zero to a logical one, the signal generating unit SGEN of the purge control unit 20C does not generate deletion requests DELRQ ((d) in FIG. 21). Thus, when there is no way WAY to be stopped from being used, the purge processing can be omitted ((g) in FIG. 21). The signal generating unit SGEN temporarily sets the request suppression signal RQHLD and the purge signal PURG to a high level on the basis of the detection pulse signals R4 and R5 corresponding to the mask bits MSK changed from a logical zero to a logical one ((e) and (f) in FIG. 21). Incidentally, when the signal generating unit SGEN illustrated in FIG. 19 receives one or more of the detection pulse signals R0 to R7, the signal generating unit SGEN may omit the setting of the request suppression signal RQHLD and the purge signal PURG to a high level. In this case, the detecting unit RDET illustrated in FIG. 19 can be omitted, and a purge state PURGST, which is an internal state of the purge control unit 20C, is maintained at a low level without being changed to a high level.

The above-described embodiment illustrated in FIGS. 18 to 21 can also provide effects similar to the effects of the embodiments illustrated in FIGS. 1 to 12 as described in the embodiment illustrated in FIGS. 13 to 16. Further, in the embodiment illustrated in FIGS. 18 to 21, the output of the deletion requests DELRQ is suppressed when there is no way WAY to be stopped from being used, so that a time taken to perform the purge processing can be shortened as compared with a case where the output of the deletion requests DELRQ is not suppressed. It is therefore possible to suppress a decrease in processing efficiency of the arithmetic processing device 100C due to unnecessary purge processing.

Incidentally, the way mask register 18C and the purge control unit 20C may be arranged in place of the way mask register 18 and the purge control unit 20 illustrated in FIG. 13 or FIG. 17.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling a processor including a cache memory including a plurality of blocks, the method comprising:
    storing usage information indicating whether to use each of the plurality of blocks;
    performing purge processing based on rewriting of the usage information according to an instruction executed by the processor, the purge processing including processing of deleting, from the cache memory, target data retained in a target block to be stopped from being used among the plurality of blocks and processing of writing the target data, the target data being data rewritten in the cache memory, to a main memory having an access speed that is lower than the cache memory; and
    suppressing, when a memory access request for accessing the cache memory is received from the processor, access to the cache memory while the target data retained in the target block is being deleted and the target data which is written in the cache memory is being written to the main memory.

2. The method according to claim 1, further comprising:
    selecting a block as a storage destination of data read from the main memory at the lower level from among blocks determined to be used by the usage information at a time of a cache miss in the cache memory; and
    replacing one of pieces of data retained by the block with the data read from the main memory at the lower level.

3. The method according to claim 1, further comprising stopping to perform the purge processing when there is no block to be stopped from being used based on the rewriting of the usage information.

4. A processor comprising:
    an arithmetic processing circuit configured to execute an instruction;
    a cache memory including a plurality of blocks;
    a usage information register configured to store usage information indicating whether to use each of the plurality of blocks;
    a purge control circuit configured to perform purge processing based on rewriting of the usage information within the usage information register according to the instruction executed by the arithmetic processing circuit, the purge processing including processing of deleting, from the cache memory, target data retained in a target block to be stopped from being used among the plurality of blocks and processing of writing the target data, the target data being data rewritten in the cache memory, to a main memory having an access speed that is lower than the cache memory; and
    an access control circuit configured to suppress, when a memory access request for accessing the cache memory is received from the arithmetic processing circuit, access to the cache memory while the target data retained in the target block is being deleted and the target data which is written in the cache memory is being written to the main memory.

5. The processor according to claim 4, further comprising a power control circuit configured to stop operation of the target block based on the usage information retained by the usage information register after completion of the purge processing.

6. The processor according to claim 4, further comprising:
    a replacement way selecting circuit configured to select a block as a storage destination of data read from the main memory at the lower level from among blocks determined to be used by the usage information retained by the usage information register at a time of a cache miss in the cache memory;
    wherein the access control circuit replaces one of pieces of data retained by the block selected by the replacement way selecting circuit with the data read from the main memory at the lower level.

7. The processor according to claim 5, wherein the power control circuit makes the plurality of blocks operate during the purge processing irrespective of the usage information retained by the usage information register.

8. The processor according to claim 4, further comprising:
    a usage information generating circuit configured to receive way number information indicating the number of blocks to be used from the arithmetic processing circuit, generate the usage information based on the received way number information, and store the generated usage information in the usage information register.

9. The processor according to claim 4, wherein when there is no block to be stopped from being used based on the rewriting of the usage information stored in the usage information register, the purge control circuit stops to perform the purge processing.

10. The processor according to claim 5,
wherein the plurality of blocks operate in synchronism with respective clocks, and
the power control circuit stops supply of the clock to the target block after the completion of the purge processing.

11. The processor according to claim 5, wherein the power control circuit stops supply of power to the target block after the completion of the purge processing.

12. The processor according to claim 4,
wherein the purge control circuit outputs, to the access control circuit, a deletion request to delete data retained by the target block and purge information indicating that the purge processing is being performed based on the rewriting of the usage information retained by the usage information register, and
the access control circuit accesses the cache memory based on the memory access request and the deletion request.

13. The processor according to claim 4,
wherein the usage information register stores a plurality of bits corresponding to the plurality of blocks, and each of the plurality of bits indicates use of the block when a bit value of the bit is a first logic, and indicates stopping of use of the block when the bit value of the bit is a second logic different from the first logic, and
the processor further includes a detecting circuit configured to notify the purge control circuit that the usage information within the usage information register is rewritten when detecting inversion of one or more of the bit values of the plurality of bits.

\* \* \* \* \*